United States Patent
Lohse et al.

(10) Patent No.: US 11,249,256 B2
(45) Date of Patent: Feb. 15, 2022

(54) FIBER OPTIC CONNECTOR WITH POLYMERIC MATERIAL BETWEEN FIBER END AND FERRULE END, AND FABRICATION METHOD

(71) Applicant: CORNING RESEARCH & DEVELOPMENT CORPORATION, Corning, NY (US)

(72) Inventors: Chenueh Abongwa Florian Lohse, Berlin (DE); Michael Wimmer, Berlin (DE)

(73) Assignee: Corning Research & Development Corporation, Corning, NY (US)

(*) Notice: Subject to any disclaimer, the term of this patent is extended or adjusted under 35 U.S.C. 154(b) by 0 days.

(21) Appl. No.: 16/675,948

(22) Filed: Nov. 6, 2019

(65) Prior Publication Data

US 2020/0073067 A1 Mar. 5, 2020

Related U.S. Application Data

(63) Continuation of application No. PCT/US2018/031967, filed on May 10, 2018.
(Continued)

(51) Int. Cl.
*G02B 6/36* (2006.01)
*G02B 6/38* (2006.01)
(Continued)

(52) U.S. Cl.
CPC .......... *G02B 6/3861* (2013.01); *G02B 6/262* (2013.01); *G02B 6/382* (2013.01); *G02B 6/3826* (2013.01);
(Continued)

(58) Field of Classification Search
CPC .... G02B 6/3861; G02B 6/262; G02B 6/3885; G02B 6/4239; G02B 6/382; G02B 6/3847; G02B 6/3826
See application file for complete search history.

(56) References Cited

U.S. PATENT DOCUMENTS 5,018,821 A * 5/1991 Kurata ................. G02B 6/3835
385/72
5,049,225 A * 9/1991 Schlingensiepen .. G02B 6/3861
156/294
(Continued)

FOREIGN PATENT DOCUMENTS

CN 104678507 A 6/2015
EP 2916151 A1 9/2015
(Continued)

OTHER PUBLICATIONS

International Search Report and Written Opinion PCT/US2018/031967 dated Sep. 3, 2018.
(Continued)

*Primary Examiner* — Ellen E Kim
(74) *Attorney, Agent, or Firm* — Kapil U. Banakar

(57) ABSTRACT

A fiber optic connector includes polymeric material arranged within a front end portion of at least one internal bore of a ferrule. At least a portion of the polymeric material extends from a terminal end of at least one optical fiber to at least a front end of the ferrule. A polymeric material end face serving as a conduit for transmitting optical signals to and/or from the at least one optical fiber. Waveguiding regions may be incorporated in polymeric material assemblies. Polymeric material may be printed, dispensed, or otherwise applied over the terminal end of the at least one optical fiber in the at least one internal bore, and subsequently cured. Polymeric material arranged over (e.g., in contact with) the terminal end of an optical fiber may reduce or eliminate the need for
(Continued)

fiber end face polishing, and creates physical contact through an optical interface without exerting undue mechanical stresses on the optical fiber.

28 Claims, 12 Drawing Sheets

Related U.S. Application Data

(60) Provisional application No. 62/508,083, filed on May 18, 2017.

(51) Int. Cl.
  *G02B 6/26* (2006.01)
  *G02B 6/42* (2006.01)

(52) U.S. Cl.
  CPC ......... *G02B 6/3847* (2013.01); *G02B 6/3885* (2013.01); *G02B 6/4239* (2013.01)

(56) References Cited

U.S. PATENT DOCUMENTS

| | | | |
|---|---|---|---|
| 5,855,503 A * | 1/1999 | Csipkes | B24B 19/226 451/278 |
| 6,409,394 B1 * | 6/2002 | Ueda | G02B 6/25 385/80 |
| 6,746,160 B2 * | 6/2004 | Takeuti | B24B 19/226 385/78 |
| 7,309,168 B2 | 12/2007 | Momiuchi et al. | |
| 7,630,609 B1 | 12/2009 | Mays, Jr. et al. | |
| 7,899,284 B2 | 3/2011 | Furue et al. | |
| 8,107,777 B2 * | 1/2012 | Farah | H01L 31/1896 385/14 |
| 9,575,262 B2 * | 2/2017 | Kondo | G02B 6/3846 |
| 2002/0110322 A1 * | 8/2002 | Brun | G02B 6/29395 385/33 |
| 2003/0021546 A1 * | 1/2003 | Sato | G02B 6/3861 385/78 |
| 2007/0137255 A1 * | 6/2007 | Miyake | G02B 6/3846 65/393 |
| 2015/0205053 A1 | 7/2015 | Aoki et al. | |
| 2016/0154187 A1 | 6/2016 | Kondo et al. | |

FOREIGN PATENT DOCUMENTS

| | | |
|---|---|---|
| KR | 101377438 B1 | 3/2014 |
| WO | 2016027214 A1 | 2/2016 |

OTHER PUBLICATIONS

Lindenmann et al; "Connecting Silicon Photonic Circuits to Multicore Fibers ny Photonic Wire Bonding"; Journal of Lightwave Technology, vol. 33, No. 4; Feb. 15, 2015; pp. 755-760.

Megladon; "HLC® Technology, HLC® Scratchguard® Scratch-Resistant Mating Surfaces" Copyright 2014-2018; Megladon® Manufacturing Group Ltd.; 2 Pages.

Schleunitz et al; "Towards High Precision Manufacturing of 3D Optical Components Using UV-Curable Hybrid Polymers"; Proc. SPIE 9368 Optical Interconnects XV, Apr. 3, 2015; pp. 93680E-1-93680E-9.

* cited by examiner

FIBER OPTIC CONNECTOR WITH POLYMERIC MATERIAL BETWEEN FIBER END AND FERRULE END, AND FABRICATION METHOD

CROSS-REFERENCE TO RELATED APPLICATIONS

This application is a continuation of International Application No. PCT/US18/31967, filed on May 10, 2018, which claims the benefit of priority to U.S. application Ser. No. 62/508,083, filed on May 18, 2017, both applications being incorporated herein by reference.

BACKGROUND

The disclosure relates generally to optical fibers, and more particularly to fiber optic connectors and methods for fabricating fiber optic connectors.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors ("connectors" or "optical connectors") are often provided on the ends of fiber optic cables. Fiber optic connectors are used to optically connect one optical fiber to another, or to connect an optical fiber to another device such as an optical transmitter or an optical receiver.

A fiber optic connector typically includes a ferrule with one or more bores that receive one or more optical fibers. The ferrule supports and positions the optical fiber(s) with respect to a housing of the fiber optic connector. Thus, when the housing of the fiber optic connector is mated with another connector (e.g., in an adapter), the optical fiber in the ferrule is positioned in a known, fixed location relative to the housing. This allows an optical connection to be established when the optical fiber is aligned with another optical fiber in the mating connector.

In fiber-to-fiber connections, fiber ends are typically terminated with care to reduce extrinsic coupling loss resulting from reflection or scattering. An optical fiber end face desirably should be flat, smooth, and perpendicular or at a desired angle to a longitudinal axis of the optical fiber. Typical steps in fiber end preparation include removal of any fiber buffer and coating materials from an end of the fiber, followed by cleaving the fiber end, and then followed by polishing. Frequently, a fiber is inserted and epoxied into a ferrule of a connector assembly with a fiber portion extending beyond a ferrule end, and then the fiber end is cleaved (if not cleaved prior to insertion into the ferrule) and polished with sequentially finer grit polishing media until a desired fiber flatness and finish are achieved at a position nearly flush with (e.g., protruding no farther than 50 nm relative to) the ferrule end. Fiber end preparation requires significant time and resources, thereby impacting manufacturing efficiency and increasing production costs.

When optical fibers of adjacent connectors are mated with one another, significant mechanical loads may be required to provide physical contact of adjacent fiber end faces sufficient to minimize optical signal attenuation. A ceramic ferrule body exhibits greater stiffness than glass optical fibers, and therefore acts as a hard stop for compression of an optical fiber in a mated condition. Typical fiber optic connectors may include optical fibers protruding forwarding from a ferrule by up to 50 nm, and faces of adjacent optical fibers may be pressed together with a maximum force of up to about 11 Newtons. Maintaining such loading may require mechanical biasing elements (e.g., springs) in fiber optic connector assemblies to be increased in size and strength. Additionally, if such loading exerts undue stress on portions of the optical fibers and/or mechanical biasing elements, then mechanical reliability of the optical fibers and/or a corresponding fiber optic connector assembly may be compromised.

SUMMARY

Aspects of the present disclosure provide fiber optic connectors with at least one polymeric material that is arranged within a front end portion of at least one internal bore of a ferrule at least in front of a terminal end of at least one optical fiber and extending to an end of the ferrule. Preferably, the at least one polymeric material is transmissive of desired wavelengths, is arranged in contact with the terminal end of the at least one optical fiber, and forms a polymeric end face configured to transmit optical signals to and/or from the at least one optical fiber. Methods for fabricating fiber optic connectors are further provided. The at least one polymeric material may be applied to (e.g., printed over and/or dispensed into) the front end portion of the at least one internal bore to contact the at least one optical fiber. Following such application, the at least one polymeric material may be cured by any suitable means, such as by one or more of the following: a chemical, thermal, or photonic interaction (wherein photonic energy may optionally be supplied by a laser). Presence of the at least one polymeric material over the terminal end of the at least one optical fiber may reduce or eliminate the need for polishing of optical fiber end faces. Additionally, utilization of polymeric material with a lower modulus of elasticity than that of glass material of the at least one optical fiber may enable intimate contact between mating signal-transmitting surfaces of adjacent connectors to be maintained without application of high forces and exertion of undue mechanical stresses on the at least one optical fiber.

In one embodiment of the disclosure, a fiber optic connector is provided. The fiber optic connector comprises a ferrule, at least one optical fiber, and at least one polymeric material. The ferrule includes a front end, a rear end, and at least one internal bore extending between the front end and the rear end. The at least one optical fiber extends through the rear end of the ferrule into the at least one internal bore. A terminal end of the at least one optical fiber is positioned between the front end and the rear end of the ferrule. The at least one polymeric material is arranged within the at least one internal bore of the ferrule at least in front of the terminal end of the at least one optical fiber and extends to at least the front end of the ferrule. For example, the at least one polymeric material may contact the terminal end of the at least one optical fiber so as to extend from the terminal end to at least the front end of the ferrule.

In another embodiment of the disclosure, a method is provided for fabricating a fiber optic connector including a ferrule. The ferrule includes a front end, a rear end, and at least one internal bore extending between the front end and the rear end. The method comprises inserting at least one optical fiber through the rear end of the ferrule into the at least one internal bore, and positioning a terminal end of the at least one optical fiber between the front end and the rear end. The method further comprises applying at least one polymeric material to a front end portion of the at least one internal bore, to cause the at least one polymeric material to extend from a location in front of the terminal end of the at least one optical fiber to at least the front end of the ferrule. The method further comprises curing the at least one polymeric material. For example, the at least one polymeric material may be applied to the terminal end of the at least one optical fiber so as to contact the terminal end and extend directly therefrom.

In another embodiment of the disclosure, another method is provided for fabricating a fiber optic connector including a ferrule. The ferrule includes a front end, a rear end, and at least one internal bore extending between the front end and the rear end. The method comprises inserting at least one optical fiber through the rear end of the ferrule into the at least one internal bore, and positioning a terminal end of the at least one optical fiber between the front end and the rear end. The method further comprises inserting at least one prefabricated polymeric material to a front end portion of the at least one internal bore, to cause the at least one prefabricated polymeric material to extend from a location in front of the terminal end of the at least one optical fiber to at least the front end of the ferrule.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. As will be discussed in more detail below, the description generally relates to a fiber optic connector including at least one polymeric material that is arranged within a front end portion of at least one internal bore of a ferrule, and that extends from a terminal end of at least one optical fiber to an end of the ferrule. At least a portion of the at least one polymeric material is arranged in an optical path of signals borne by the at least one optical fiber; accordingly, the at least one polymeric material is transmissive of desired wavelengths. The at least one polymeric material is arranged in contact with the terminal end of the at least one optical fiber and forms a polymeric end face, with the at least one polymeric material serving as a conduit for transmitting optical signals to and/or from the at least one optical fiber. Methods for fabricating fiber optic connectors are further provided, in which the at least one polymeric material may be applied to the front end portion of the at least one internal bore to contact the at least one optical fiber, and the at least one polymeric material may be cured thereafter.

Figures 1, 2:
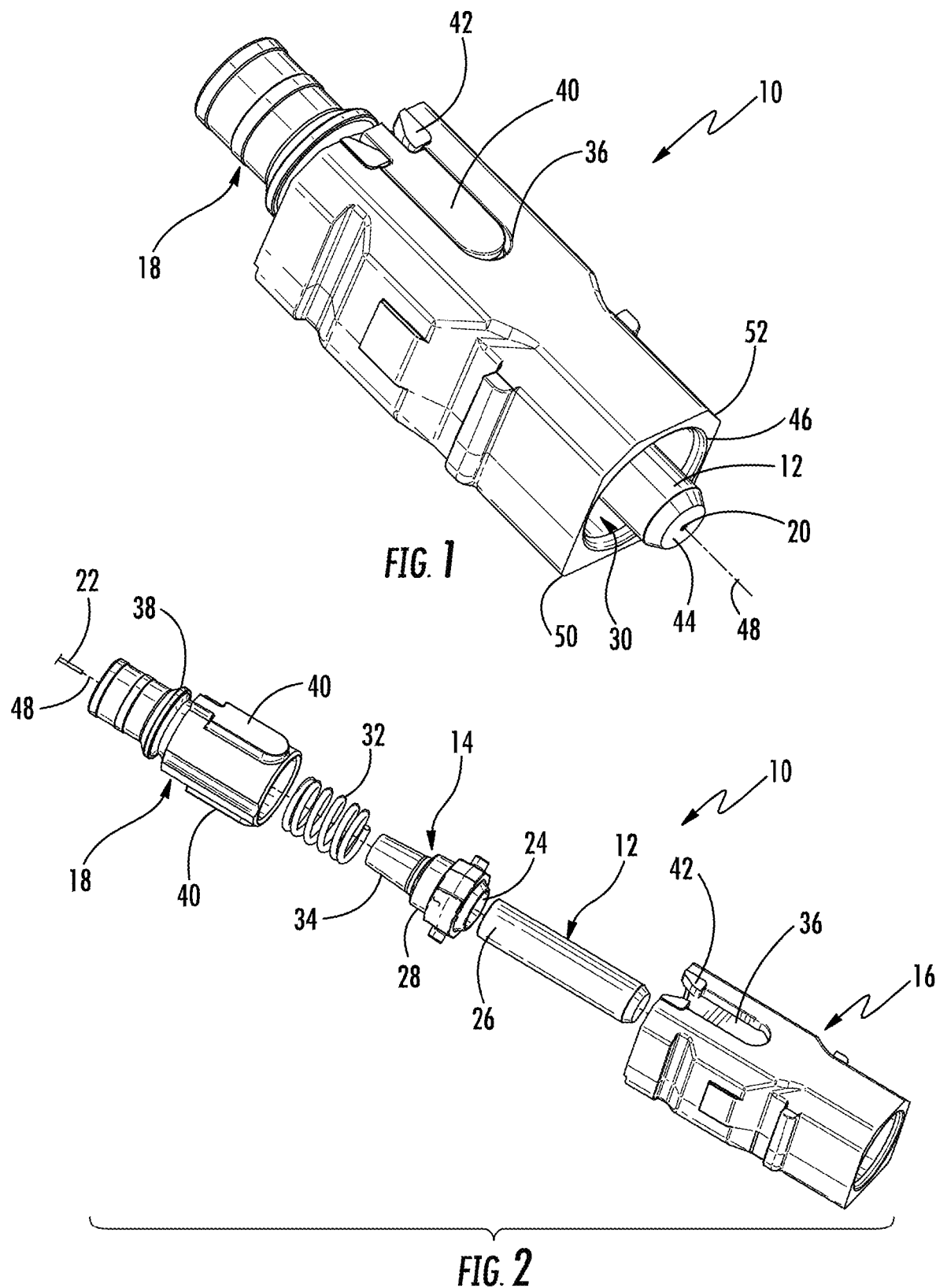
FIG. 1 is a perspective view of an example of a conventional fiber optic connector incorporating an optical fiber retained in a bore of a ferrule.
FIG. 2 is an exploded view of the fiber optic connector of FIG. 1.
Figure 3:
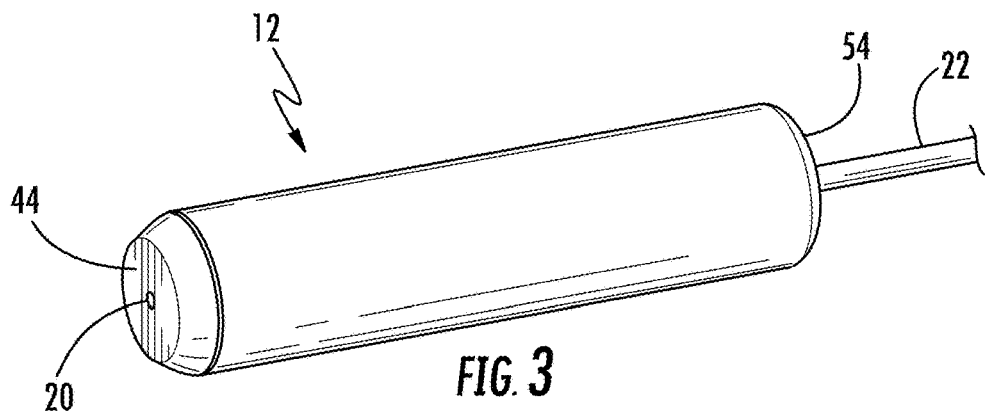
FIG. 3 is a perspective view of the ferrule of the fiber optic connector of FIGS. 1 and 2, with the optical fiber received by the ferrule.
Figure 4:
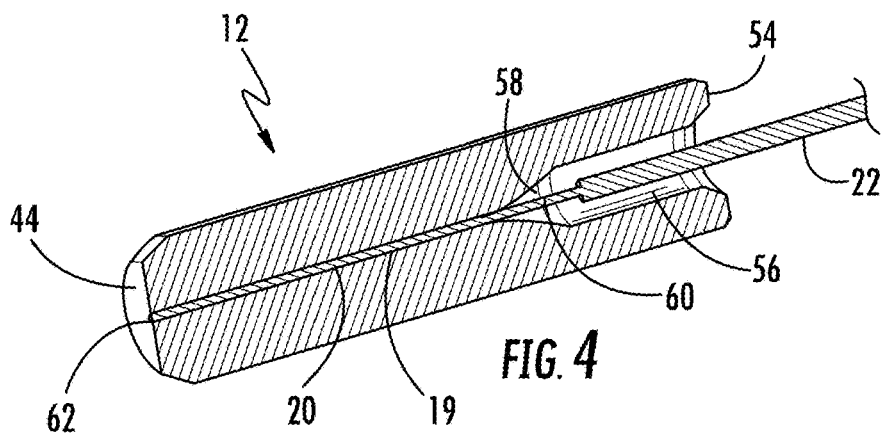
FIG. 4 is a cross-sectional view of the ferrule and optical fiber of FIG. 3, with a terminal end of the optical fiber arranged substantially flush with an end of the ferrule.

Before discussing fiber optic connector embodiments and fabrication methods utilizing polymeric material arranged between a terminal end of at least one optical fiber and an end of a ferrule, a brief overview of a connector 10 shown in FIGS. 1 and 2, as well as a ferrule 12 shown in FIGS. 3 and 4, will be provided to facilitate discussion. It is to be appreciated that the ferrules and polymeric material portions shown in subsequent figures may be used with the same type of connector as the connector 10. Although the connector 10 is shown in the form of a SC-type connector, persons skilled in the field of optical connectivity will appreciate that the connector 10 is merely an example, and that the general principles disclosed with respect to the ferrules and other components shown in subsequent figures may also be applicable to other connector and/or ferrule designs. For example, in certain embodiments, a connector may include a ferrule configured to receive multiple optical fibers and/or at least one multi-core optical fiber in one or more internal bores of the ferrule.

As shown in FIGS. 1 and 2, the connector 10 includes the ferrule 12, a ferrule holder 14 from which the ferrule 12 extends, a housing 16 having a cavity 30 in which the ferrule holder 14 is received, and a connector body 18 configured to retain the ferrule holder 14 within the housing 16. The connector body 18 may also be referred to as "retention body 18" or "crimp body 18". One portion of the connector body 18 is received in the housing 16. The ferrule 12 includes a small diameter bore section 20 (or "micro-hole") configured to support an optical fiber 22, which is secured in the small diameter bore section 20 using an adhesive material (e.g., epoxy). The ferrule holder 14 includes a ferrule holder bore 24 from which the ferrule 12 extends. More specifically, a rear portion 26 of the ferrule 12 is received in the ferrule holder bore 24 defined in (at least) a first portion 28 of the ferrule holder 14, and is secured therein in a known manner (e.g., press-fit, adhesive, molding the ferrule holder 14 over the rear portion 26 of the ferrule 12, etc.). The ferrule 12 and ferrule holder 14 may even be a monolithic structure in some embodiments. The ferrule holder 14 is biased to a forward position within the cavity 30 of the housing 16 by a spring 32, which extends over a second portion 34 of the ferrule holder 14 that has a reduced cross-sectional diameter/width compared to the first portion 28.

FIGS. 1 and 2 illustrate a rear portion of the housing 16 having cut-outs or slots 36 on opposite surfaces so as to define a split shroud. The connector body 18 is generally tubular in shape with a medial shoulder 38 arranged between different diameter portions. The connector body 18 further includes protrusions 40 (which may embody tabs) configured to be snapped into the slots 36 of the housing 16 and retained therein due to the geometries of the components and the presence of locking tabs 42 proximate to a leading edge of each slot 36 of the housing 16.

When the connector 10 is assembled as shown in FIG. 1, a front end 44 of the ferrule 12 projects beyond a front end 46 of the housing 16. The front end 44 of the ferrule 12 presents the optical fiber 22 retained therein for optical coupling with a mating component (e.g., another fiber optic connector; not shown), with the ferrule 12 serving to generally align the optical fiber 22 in an axial direction along a longitudinal axis 48. The housing 16 includes a roughly rectangular cross-sectional shape perpendicular to the longitudinal axis 48, with two adjacent non-beveled corners 50 and two adjacent beveled corners 52 embodying transitions between four outer faces of the housing 16 proximate to the front end 46 of the housing 16. The non-beveled corners 50 and the beveled corners 52 in combination ensure that the connector 10 must be in a specific orientation when received by a connector receiving structure (e.g., a female connector, a socket, a receptacle, etc. (not shown)).

FIGS. 3 and 4 provide perspective and cross-sectional views, respectively, of the ferrule 12 that was previously shown in FIGS. 1 and 2 as part of the connector 10. The ferrule 12 is generally cylindrical in shape, and defines a bore 19 extending between front and rear ends 44, 54. Exemplary materials for fabrication of the ferrule 12 include ceramic or glass. In FIG. 4, the bore 19 comprises the small diameter bore section 20, a larger diameter bore rear section 56, and an intermediate bore section 58. The intermediate bore section 58 has a tapered diameter and extends between the small diameter bore section 20 and the larger diameter bore rear section 56. As shown in FIG. 4, the larger diameter bore rear section 56 is proximate to the rear end 54 of the ferrule 12 (e.g., the larger diameter bore rear section 56 extends inward from the rear end 54), and the small diameter bore section 20 extends from the intermediate bore section 58 to the front end 44 of the ferrule 12. A segment of coated optical fiber 22 is received by the larger diameter bore rear section 56, and transitions to a segment of bare optical fiber 60 that has a small diameter than the segment of coated optical fiber 22 and that is received by the small diameter bore section 20. An adhesive material, such as epoxy (not shown), may be provided between the segment of bare optical fiber 60 and the small diameter bore section 20 to secure the segment of bare optical fiber 60 to the ferrule 12. With continued reference to FIG. 4, the segment of bare optical fiber 60 extends to the front end 44 of the ferrule 12, and includes a terminal end 62 that is substantially flush with the front end 44. This terminal end 62 is typically polished to attain a desired fiber flatness and finish suitable for mating with a suitably prepared fiber of a mating connector or receptacle (not shown).

Now that general overviews of the connector 10 and the ferrule 12 have been provided, embodiments of the present disclosure will be described.

Figure 5:
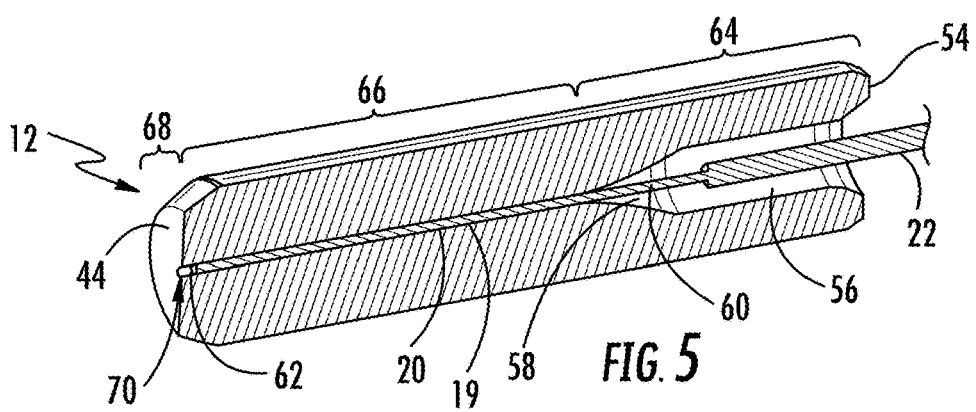
FIG. 5 is a cross-sectional view of a ferrule according to FIGS. 3 and 4, but with the terminal end of a bare optical fiber segment retracted rearward between front and rear ends of the ferrule to define a recess suitable for receiving a polymeric material.

FIG. 5 is a cross-sectional view of an example of a ferrule 12 according to FIG. 4, but with the terminal end 62 of the bare optical fiber 60 retracted rearward within the small diameter bore section 20 to a position between the front end 44 and the rear end 54 of the ferrule 12. As was the case with FIG. 4, the ferrule 12 includes an internal bore consisting of the small diameter bore section 20, the larger diameter bore rear section 56, and the intermediate bore section 58. Positioning of the terminal end 62 of the bare optical fiber 60 between the front and rear ends 44, 54 yields a recess 70 (i.e., an unfilled portion of the small diameter bore section 20) proximate to the front end 44 of the ferrule 12. The ferrule 12 and the internal bore may each be considered to include a rear portion 64 (of a first average diameter), a medial portion 66 (of a second average diameter), and a front end portion 68 (of a third average diameter). In certain embodiments, the third average diameter of the front end portion 68 exceeds the second average diameter of the medial portion 66. The rear portion 64 encompasses the larger diameter bore rear section 56 and the intermediate bore section 58. The larger diameter bore rear section 56 receives a segment of coated optical fiber 22. The medial portion 66 encompasses the small diameter bore section 20 that extends between the intermediate bore section 58 and the terminal end 62 of the bare optical fiber 60. The front end portion 68 encompasses the small diameter bore section 20 that extends between the terminal end 62 of the bare optical fiber 60 and the front end 44 of the ferrule 12. In the case of FIG. 5, the front end portion 68 of the internal bore is coextensive with the recess 70. Such recess 70 is suitable for receiving and retaining at least one polymeric material, as discussed in connection with FIG. 6.

Figure 6:
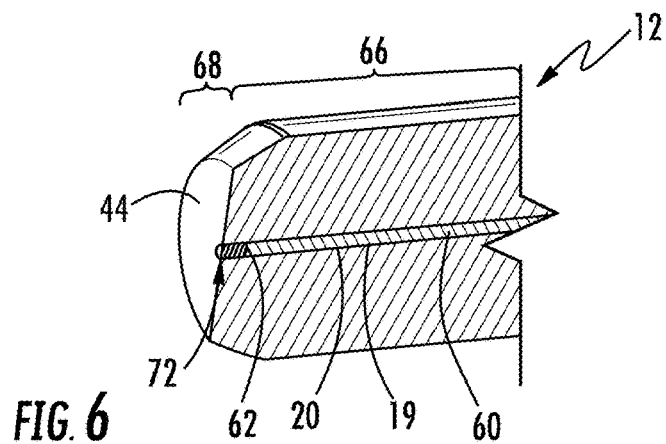
FIG. 6 is a magnified cross-sectional view of a portion of the ferrule and optical fiber of FIG. 5, following addition of a polymeric material within a front end portion of an internal bore of the ferrule to contact the terminal end of the optical fiber, according to one embodiment of the present disclosure.

FIG. 6 is a magnified cross-sectional view of a portion of the ferrule 12 and bare optical fiber 60 of FIG. 5, following addition of a polymeric material 72 within the front end portion 68 of the internal bore of the ferrule 12 (i.e., with such polymeric material 72 filling the recess 70 shown in FIG. 5). The polymeric material 72 within the front end portion 68 extends forward from the terminal end 62 of the bare optical fiber 60 to at least the front end 44 of the ferrule 12. In certain embodiments, the polymeric material 72 extends forward slightly beyond the front end 44 of the ferrule 12. The front end portion 68 of the internal bore includes the same dimensions as the small diameter bore section 20, which embodies a medial portion 66 of the internal bore. Due to a close dimensional fit between the bare optical fiber 60 and the small diameter bore section 20, as well as the potential presence of adhesive material (not shown) therebetween, substantially an entirety (e.g., at least 90%) of the polymeric material 72 may be arranged forward of the terminal end 62 of the bare optical fiber 60 (i.e., without presence of significant polymeric material 72 in contact with a side wall of the bare optical fiber 60).

To promote intimate physical contact between the polymeric material 72 and the terminal end 62 of the bare optical fiber 60 without gaps, in certain embodiments the polymeric material 72 is supplied to the front end portion 68 of the internal bore in a flowable form (e.g., a liquid, gel, suspension, or the like), and thereafter is cured to cause the polymeric material 72 to stiffen or at least partially solidify. Various techniques for curing polymeric material may be used, such as one or more of photonic, thermal, or chemical interaction. In certain embodiments, the polymeric material 72 may be supplied to the front end portion 68 of the internal bore by three-dimensional printing. In certain embodiments, the polymeric material 72 may be at least partially cured by impingement thereon of emissions (e.g., in an ultraviolet (UV) or near-UV wavelength range) of a laser, a light-emitting diode, or another suitable electromagnetic radiation source. Preferably, the polymeric material 72 may be processed to achieve more precise dimensioning, more precise mating locations, and/or greater uniformity of an end face than may be obtained using glass polishing processes traditionally utilized with optical fibers. In this regard, optical fibers and/or optical fiber cores overlaid with one or more polymeric materials as disclosed herein may yield end faces and end conditions that are substantially identical in nanometer scale, thereby providing improved uniformity relative to use of traditional optical fiber polishing processes. In certain embodiments, a micromold providing a negative representation of one more raised and/or recessed features may be arranged over a front end portion of an internal bore (e.g., during and/or after application of flowable polymeric material), and such polymeric material may be partially or fully cured with the micromold in place, followed by release of the micromold to define one or more raised and/or recessed features in and/or on the polymeric material. To reduce or minimize the possibility of trapping air bubbles in the polymeric material as disclosed herein, in certain embodiments, polymeric material may be applied and/or cured in a sub-atmospheric pressure environment.

Examples of desirable polymeric material that may be used include, but are not limited to, UV-curable inorganic-organic hybrid polymers. Such materials exhibit both inorganic and organic units. The organic units bear polymerizable moieties and various functional groups that enable photo-induced curing, whereas an inorganic backbone provides good optical transparency as well as high thermal, chemical, and mechanical stability. One type of hybrid polymer includes ORMOCER® (a trademark of Fraunhofer Gesellschaft zur Forderung der angewandten Forschung e.V., Munich, Germany) polymers, which are used in multiple commercial applications. The synthesis of ORMOCER®-type inorganic-organic hybrid polymers is based on a sol-gel reaction, in which a hydrolysis-condensation reaction of organically modified silicic acid precursors (i.e., silicon-containing monomers) leads to nano-scaled oligomers with inorganic backbones. Addition of various functional additives and photo-initiators creates a solvent-free viscous oligomer solution that can be cross-linked upon exposure to UV light. Hybrid polymers based on similar chemistries that may be used include OrmoComp™ and OrmoClear™ polymers commercially available from Micro Resist Technology GmbH (Berlin, Germany).

FIGS. 5 and 6 depict features useful for describing steps of a method for fabricating a fiber optic connector utilizing the ferrule 12. An advance method step may include preparing the coated optical fiber 22 for connectorization by stripping external layers away from a front segment to yield a segment of bare optical fiber 60. Another advance method step may include supplying an adhesive material to the small diameter bore section 20 of the ferrule 12. Thereafter, a method step may include inserting the segment of bare optical fiber 60 through the rear end 54 of the ferrule 12, through the larger diameter bore rear section 56, and through the small diameter bore section 20 to cause a leading end of the bare optical fiber 60 to extend beyond the front end 44 of the ferrule 12. Such step may cause excess adhesive material previously supplied to the internal bore of the ferrule 12 to propagate to (e.g., be carried by) a leading end of the bare optical fiber 60. Such leading end may then be processed (e.g., by cleaving and application of one or more cleaning steps) to remove any excess adhesive material and yield the terminal end 62 of the bare optical fiber 60. Thereafter, the terminal end 62 may be retracted into the internal bore of the ferrule 12 to a position between the front and rear ends 44, 54 thereof, with such retraction desirably serving to create the recess 70 shown in FIG. 5. Then, as shown in FIG. 6, at least one polymeric material 72 is applied to the front end portion 68 of the internal bore, and such polymeric material 72 is cured, causing the polymeric material 72 to extend from the terminal end 62 of the bare optical fiber 60 to at least the front end 44 of the ferrule 12, and preferably slightly forward of the front end 44. Alternatively, the polymeric material 72 may be prefabricated (shown in FIGS. 20-23) and inserted into the internal bore of the ferrule 12. Adhesive (e.g., epoxy or the like) may be applied before or after insertion of the prefabricated polymeric material 72. Thereafter, the adhesive may be cured to affix the prefabricated polymeric material 72 within the internal bore of the ferrule 12.

Presence of polymeric material between optical fiber end faces of two mating connector assemblies necessarily distances the optical fiber end faces from one another. Generally, increasing thickness of this polymeric material tends to reduce the mechanical loads required to enable intimate contact between mating signal-transmitting surfaces of adjacent connectors, but also tends to increase insertion losses and attenuation of optical signals. Restated, the thicker the polymeric material overlying terminal ends of optical fibers, the more robust the mechanical interface will be between mating signal-transmitting surfaces of adjacent connectors, but optical performance will suffer. Through appropriate modeling, Applicant has determined that if OrmoStamp™ hybrid polymer material or OrmoClear™ hybrid polymer material (both commercially available from Micro Resist Technology GmbH (Berlin, Germany)) is used as a polymeric material between a terminal end of an optical fiber and an end face, then an acceptably low insertion loss value of no greater than 0.5 dB may be obtained over a distance of no greater than about 50 µm for physical contact between two connectors. Since this distance threshold corresponds to passage of signals through two mated polymeric materials, each polymeric material should have a thickness of no greater than about 25 µm overlying a terminal end of a corresponding optical fiber to maintain a desirably low insertion loss of no greater than 0.5 dB according to this example. Thus, in certain embodiments, polymeric material regions overlying terminal ends of optical fibers may have thicknesses in a range of from about 0.5 µm to about 25 µm. If greater insertion losses may be tolerated, then the foregoing maximum thickness values for polymeric materials may be increased (e.g., to about 50 µm), and vice-versa. In certain embodiments utilizing waveguiding regions within polymeric material assemblies, the foregoing thickness values may be increased, as discussed in more detail hereinafter.

To facilitate greater mechanical compression of polymeric material proximate to a terminal end of an optical fiber, in certain embodiments the polymeric material may extend rearward past the terminal end (e.g., with the polymeric material forming an annular cross-sectional shape) and laterally encapsulate the optical fiber. Such arrangement may permit the thickness of polymeric material overlying a terminal end of an optical fiber to be decreased, thereby permitting the optical distance between two optical fibers of a connection to be decreased and enhancing optical performance. Intimate physical contact between polymeric end faces is desirable to avoid a gap that would attenuate transmission of optical signals.

Figure 9:
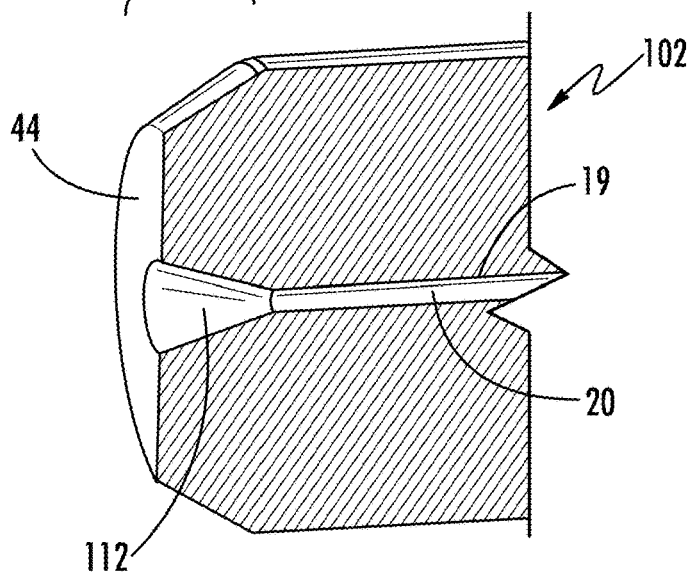
FIG. 9 is a magnified cross-sectional view of a portion of a ferrule defining an internal bore, with a medial portion of the internal bore having a first diameter, and with a front end portion of the internal bore including a conical shape having an increased diameter relative to the medial portion and having a maximum diameter at an end of the ferrule.
Figure 10:
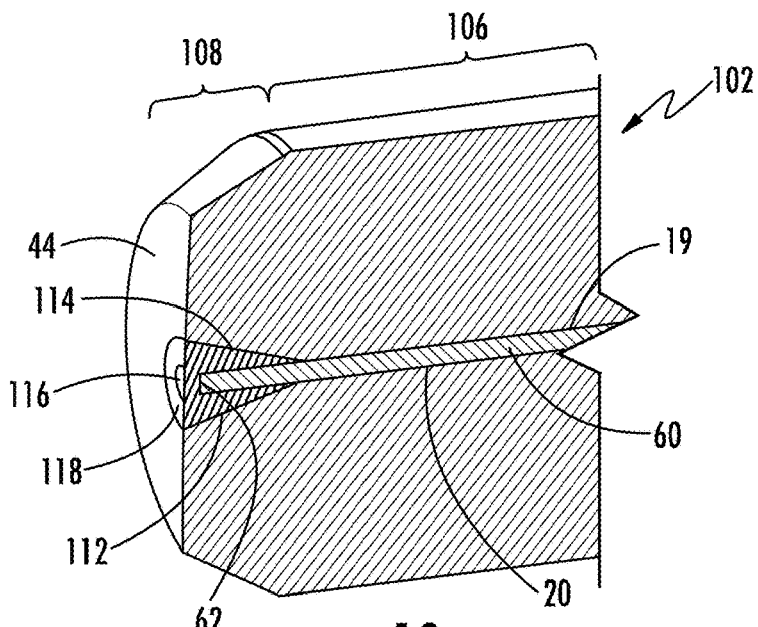
FIG. 10 is a magnified cross-sectional view of the ferrule portion of FIG. 9, following insertion of an optical fiber through the medial portion of the internal bore into the front end portion thereof with a terminal end of the optical fiber distanced from the front end of the ferrule, and following addition of a polymeric material into the front end portion of the internal bore to surround the terminal end of the optical fiber.

To permit polymeric material to laterally encapsulate an optical fiber, in certain embodiments, a front end portion of an internal bore of a ferrule may include a greater diameter than a medial portion of the internal bore. An increased diameter front end portion of an internal bore of a ferrule may be provided in various shapes, including (but not limited to) cylindrical shapes as shown in FIGS. 7 and 8, and conical (or frustoconical) shapes as shown in FIGS. 9 and 10.

Figure 7:
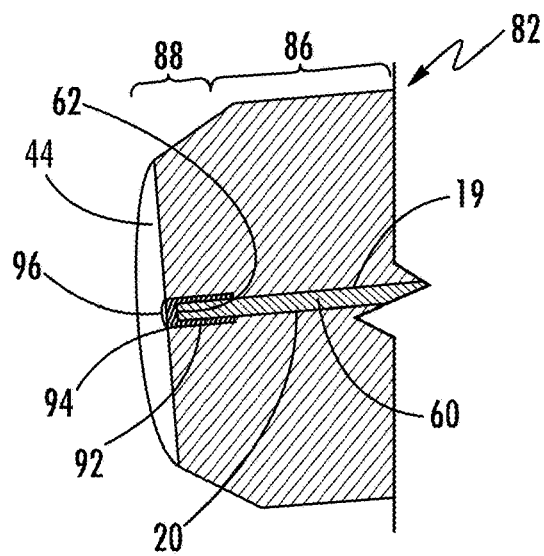
FIG. 7 is a magnified cross-sectional view of a portion of a ferrule having an optical fiber retained in an internal bore thereof, with a front end portion of the internal bore including a cylindrical shape having a diameter greater than a medial portion of the internal bore, and with polymeric material filling the front end portion of the internal bore to surround a terminal end of the optical fiber.

FIG. 7 is a magnified cross-sectional view of a portion of a ferrule 82 retaining a segment of a bare optical fiber 60. The ferrule 82 includes an internal bore 19 encompassing a small diameter bore section 20 and a cylindrically shaped larger diameter bore section 92 that is proximate to a front end 44 of the ferrule 82. The ferrule 82 and the internal bore 19 may each be considered to include a medial portion 86 and a front end portion 88, with the medial portion 86 of the internal bore 19 encompassing the small diameter bore section 20 and the front end portion 88 encompassing the larger diameter bore section 92. The segment of bare optical fiber 60 extends forward from the small diameter bore section 20 into the larger diameter bore section 92, but a terminal end 62 of the bare optical fiber 60 does not extend to the front end 44 of the ferrule 82. A polymeric material 94 is arranged within the larger diameter bore section 92 (embodying the front end portion 88 of the internal bore 19) to overlap the terminal end 62 of the bare optical fiber 60 and encapsulate lateral portions thereof. The polymeric material 94 further defines a polymeric end face 96 that preferably protrudes slightly forward beyond the front end 44 of the ferrule 82. Presence of a portion of the polymeric material 94 extending rearward past the terminal end 62 of the bare optical fiber 60 may enhance mechanical compliance or the cushioning effect of the polymeric material 94 without requiring an undue thickness of polymeric material 94 to be placed between the terminal end 62 of the bare optical fiber 60 and the polymeric end face 96. Forward protrusion of the polymeric end face 96 slightly beyond the front end 44 permits the polymeric material 94 to intimately contact a signal-transmitting surface of an adjacent connector (e.g., an end face comprising the same or a similar polymeric material, or comprising a suitably polished glass tip of an optical fiber, not shown).

In certain embodiments, multiple polymeric materials may be arranged within (and optionally extend beyond) a front end portion of at least one internal bore of a ferrule, with at least some polymeric materials sequentially arranged in an optical path of signals borne by at least one optical fiber. For instance, different polymeric materials may be deposited as sequential layers, with different layers embodying different properties and/or serving different functions, such as: scratch resistance, anti-reflectance, anti-static, and/or lensing utility (e.g., beam shaping). In certain embodiments, different polymeric materials may be provided by altering the presence and/or concentration of different additives. Enhancement of scratch resistance may beneficially enable a higher number of connector mating cycles, provide robustness against dirt and contamination, and enable end faces to undergo various cleaning procedures with reduced impact on reliability. Enhancement of anti-reflectance properties may enable a reduction in insertion loss and further stabilize optical performance in the use of mated fiber optic connectors. Enhancement of anti-static properties may provide a self-cleaning effect, thereby reducing the frequency and/or amount of cleaning required, or simply avoiding contamination altogether. Provision of lensing utility with one or more optical material layers may permit a beam carried by an optical fiber to be better guided in a connection location, to avoid undue signal transmission losses.

Figure 8:
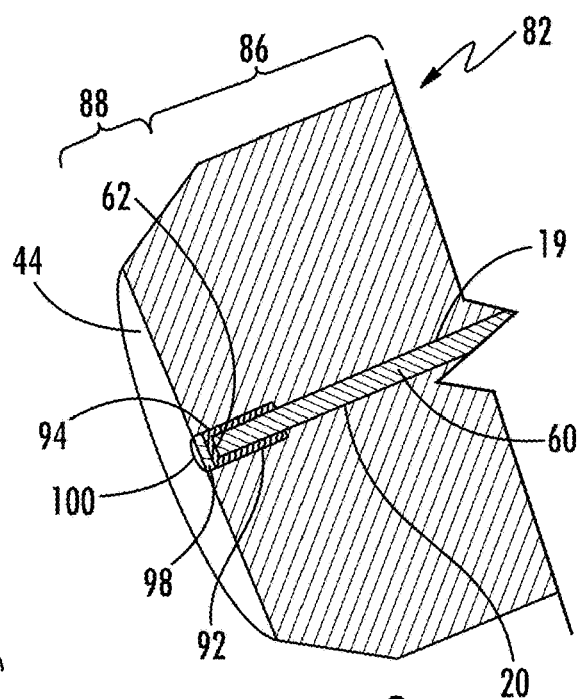
FIG. 8 is a magnified cross-sectional view of the portion of the ferrule and the optical fiber according to FIG. 7, but modified with a first (inner) polymeric material filling an inner part of the front end portion of the internal bore to surround the terminal end of the optical fiber, and with a second (outer) polymeric material filling an outer part of the front end portion to overlie the first polymeric material.

FIG. 8 illustrates the ferrule 82 and the bare optical fiber 60 shown in FIG. 7, but with modification to materials arranged proximate to the terminal end 62 of the bare optical fiber 60. As shown in FIG. 8, the segment of bare optical fiber 60 still extends forward from the small diameter bore section 20 into the larger diameter bore section 92. Additionally, the polymeric material 94 is arranged within a part of the larger diameter bore section 92 (embodying the front end portion 88 of the internal bore 19) to overlap the terminal end 62 of the bare optical fiber 60 and encapsulate lateral portions of the bare optical fiber 60 in the larger diameter bore section 92. The polymeric material 94 in this embodiment, however, does not define an end face for contacting a signal-transmitting surface of another connector. Instead, the polymeric material 94 embodies a first polymeric material, and a second polymeric material 98 is sequentially arranged over (i.e., forward of) the first polymeric material 94, with the second polymeric material 98 forming a polymeric end face 100 configured to permit transmission of optical signals to and/or from the bare optical fiber 60. Optionally, the polymeric end face 100 may extend slightly forward of the front end 44 of the ferrule 82. As shown, layers of both the second polymeric material 98 and a portion of the first polymeric material 94 are arranged in an optical path of signals borne by the bare optical fiber 60. Although only two layers of the polymeric materials 94, 98 are shown, it is to be appreciated that any suitable number of two, three, four, or five or more layers of polymeric material may be sequentially arranged in (or forward of) the front end portion 88 of the internal bore 19 of the ferrule 82. In certain embodiments, one or more initial polymeric material layers may be applied and cured, followed by application and curing of one or more subsequent polymeric material layers. In other embodiments, one or more initial polymeric material layers may be applied, one or more subsequent polymeric material layers may be applied, and the foregoing layers may be cured in a substantially simultaneous manner (e.g., utilizing one or more curing operations).

In contrast to the cylindrically shaped larger diameter bore section 92 of the front end portion 88 of the internal bore 19 shown in FIGS. 7 and 8, in certain embodiments, ferrules may include internal bores having conical or frustoconical front end portions. FIG. 9 is a magnified cross-sectional view of a portion of a ferrule 102 defining an internal bore 19 encompassing a small diameter bore section 20 and a larger diameter bore section 112. The ferrule 102 and the internal bore 19 may each be considered to include a medial portion 106, and a front end portion 108, with the medial portion 106 of the internal bore 19 encompassing the small diameter bore section 20, and the front end portion 108 encompassing the larger diameter bore section 112. The front end portion 108 of the internal bore 19 includes a generally conical shape having an increased diameter relative to the medial portion 106 of the internal bore 19, and having a maximum diameter at a front end 44 of the ferrule 102. The front end portion 108 of the internal bore 19 is suitable for receiving at least one polymeric material, as will be described in greater detail in connection with FIG. 10.

FIG. 10 is a magnified cross-sectional view of the ferrule 102 of FIG. 9, following insertion of a bare optical fiber 60 through the medial portion 106 of the internal bore 19 into the front end portion 108 thereof. The medial portion 106 of the internal bore 19 corresponds to a small diameter bore section 20. As shown, a terminal end 62 of the bare optical fiber 60 is distanced rearward from the front end 44 of the ferrule 102. The front end portion 108 of the internal bore 19 (corresponding to the larger diameter bore section 112) contains a polymeric material 114 that covers the terminal end 62 of the bare optical fiber 60 and also laterally encapsulates the portion of the bare optical fiber 60 contained within the front end portion 108 of the internal bore 19. The polymeric material 114 defines a polymeric end face that encompasses a central portion 116 and a peripheral portion 118. At least a portion of the polymeric end face (e.g., including at least the central portion 116) may extend forward beyond the front end 44 of the ferrule 102, with a maximum forward extension of the polymeric material 114 corresponding to a forward projection of the terminal end 62 of the bare optical fiber 60. Such arrangement enables compression of the polymeric material 114, particularly when mated with a correspondingly shaped second polymeric end face, to reduce or eliminate a boundary between mated end faces. As shown in FIG. 10, the polymeric material 114 has a maximum diameter (i.e., at the polymeric end face) that exceeds a diameter of the bare optical fiber 60, such that a portion of the polymeric material 114 (i.e., forming a generally annular shape) extends laterally relative to a forward projection of the terminal end 62 of the bare optical fiber 60. In certain embodiments, a central volume of the polymeric material 114 (e.g., between the central portion 116 of the polymeric end face and the terminal end 62 of the bare optical fiber 60) and a peripheral volume of the polymeric material 114 may be subject to different curing and/or shaping steps to separately affect their mechanical and/or optical properties. For example, one or more laser beams may be focused on a central volume of the polymeric material 114 according to a first time and/or energy profile as part of a first curing operation, and one or more laser beams may be focused on a peripheral volume of the polymeric material 114 according to a second time and/or energy profile as part of a second curing operation. Alternatively, the central and peripheral volumes of the polymeric material 114 may be subject to the same curing and/or shaping steps, whether performed simultaneously or at different times. In certain embodiments, the peripheral portion 118 of the end face of the polymeric material 114 may protrude less forwardly than the central portion 116 thereof, such that the central portion 116 may form a small contact area compression bump. Such a compression bump (also referred to as a protrusion) may embody a smaller diameter domed, hemispheric, cylindrical, or similar shape extending forward relative to the peripheral portion 118, wherein the polymeric end face may be perpendicular to, or slightly angled (e.g., 1-15 degree angle, 8 degree angle, etc.) from perpendicular, relative to a longitudinal axis of at least one fiber or fiber core, as the case may be for single mode connectors. Further, the compression bump may decrease the amount of compressive force required to achieve a desired contact pressure between mating end faces of connectors utilizing this feature.

In certain embodiments, the ferrule 102 may be backward compatible with ferrules incorporating fibers having polished end faces, such as the ferrule 12 of FIGS. 3 and 4. In particular, as noted above, the ferrule 12 of FIGS. 3 and 4 includes ceramic or glass which acts as a hard stop. The compression bump of the polymeric material 114 is deformable upon contact with the ferrule 12 of FIGS. 3 and 4, thereby closing gaps in the optical connection. The ferrule 102, and in particular, the compression bump of the polymeric material 114, is designed and configured to protect the polymeric material 114 from being overstressed upon engagement with the ferrule 12 of FIGS. 3 and 4. It is also noted that other ferrules described herein may also be backwards compatible.

Figure 11:
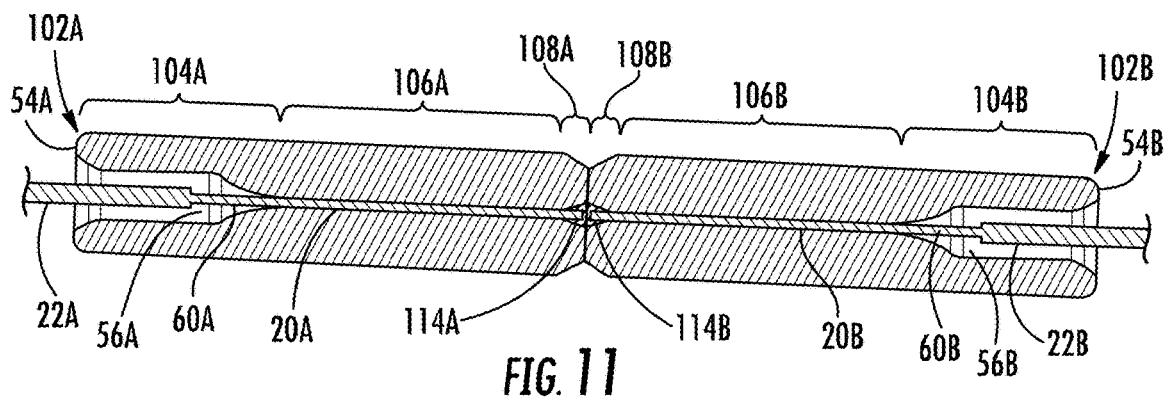
FIG. 11 is a cross-sectional view of two optical fiber-retaining ferrules with polymeric material arranged in conical end portions of internal bores thereof according to FIG. 10, with the ferrule ends and respective polymeric materials registered with and contacting one another to permit optical signal transmission between the optical fibers.
Figure 12:
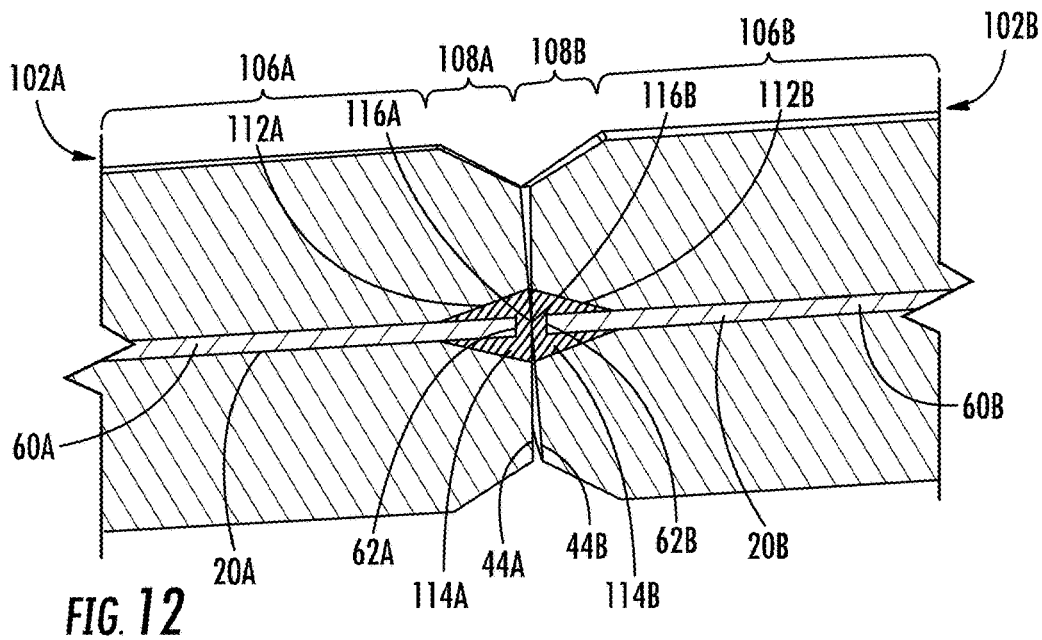
FIG. 12 is a magnified cross-sectional view of a central portion of FIG. 11.
Figure 13:
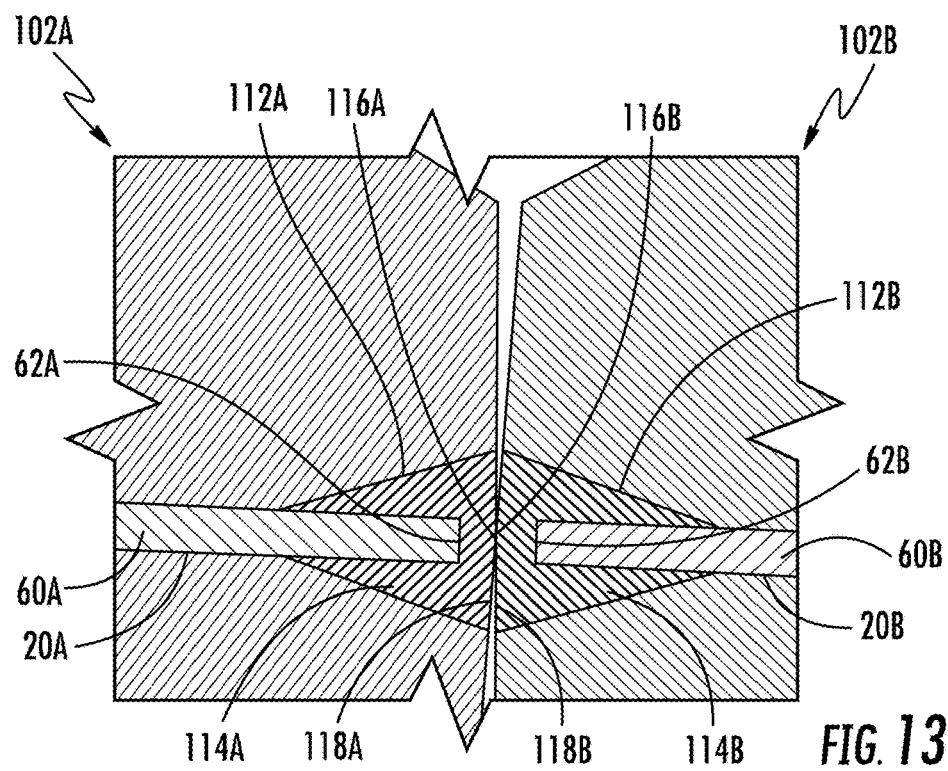
FIG. 13 is a further magnified cross-sectional view of a central portion of FIG. 12.

FIG. 11 is a cross-sectional view of two optical fiber-retaining ferrules 102A, 102B each embodying the features of the portion of a ferrule 102 shown in FIG. 10. Additionally, FIG. 12 is a magnified cross-sectional view of a central portion of FIG. 11, and FIG. 13 is an even further magnified cross-sectional view of a central portion of FIG. 12. Different magnifications are provided in FIGS. 11-13 to enable specific features to be emphasized where necessary. Referring generally to FIGS. 11-13, each ferrule 102A, 102B includes a front end 44A, 44B, a rear end 54A, 54B, and polymeric material 114A, 114B arranged in a conical shape within a front end portion 108A, 108B of an internal bore. Each internal bore encompasses a small diameter bore section 20A, 20B arranged between a larger diameter bore section 112A, 112B and a larger diameter rear bore section 56A, 56B. At least central portions 116A, 116B of the end faces of the polymeric materials 114A, 114B are arranged in contact with one another to permit optical signal transmission between segments of bare optical fibers 60A, 60B retained in the small diameter bore sections 20A, 20B of the respective ferrules 102A, 102B. The ferrules 102A, 102B and corresponding internal bores may each be considered to include a rear portion 104A, 104B, a medial portion 106A, 106B, and the corresponding front end portion 108A, 108B. Each rear portion 104A, 104B encompasses a larger diameter bore rear section 56A, 56B that receives a segment of coated optical fiber 22A, 22B. Each medial portion 106A, 106B encompasses the small diameter bore section 20A, 20B, and each front end portion 108A, 108B encompasses the larger diameter bore section 112A, 112B that contains polymeric material 114A, 114B as well as a terminal end 62A, 62B of the corresponding bare optical fibers 60A, 60B. As shown in FIGS. 12 and 13, the terminal end 62A, 62B of each bare optical fiber 60A, 60B is arranged rearward of a front end 44A, 44B of the corresponding ferrule 102A, 102B. As shown in FIG. 13, each polymeric material 114A, 114B includes a polymeric end face including a central portion 116A, 116B (which is arranged forward of the terminal end 62A, 62B of the corresponding bare optical fiber 60A, 60B) and a peripheral portion 118A, 118B. A peripheral portion 118A, 118B of each polymeric material 114A, 114B laterally encapsulates a portion of the corresponding bare optical fiber 60A, 60B. As shown in FIGS. 12 and 13, at least a central portion 116A, 116B of the polymeric end face of each polymeric material 114A, 114B extends slightly forward of the front end 44A, 44B of the corresponding ferrule 102A, 102B, such that less than the entirety of each ferrule front end 44A, 44B contacts the other.

Separately from adjustment of the diameter of a front end portion of an internal bore of a ferrule in which polymeric material may be deposited, properties such as size, shape, and modulus of elasticity of one or more forwardly-projecting portions of a polymeric end face may be selected to achieve a desired interfacial contact pressure for a given application of force. Glass has a modulus of elasticity of about 70,000 MPa. If polymeric material having a lower modulus of elasticity than that of glass is used, then the force required to create physical contact through an optical interface may be reduced. Conversely, if polymeric material having a higher modulus of elasticity than glass is used, then at least some compressive mechanical load will be applied to a glass fiber retained therein upon creation of a physical contact condition with another mating end surface. In certain embodiments, one or more polymeric materials arranged in an internal bore of a ferrule proximate to a terminal end of an optical fiber comprises a modulus of elasticity that is in a range of about 20% to about 90%, or a range of about 25% to about 75%, or a range of about 30% to about 65%, or a range of about 35% to about 60% of a modulus of elasticity of glass material of the optical fiber. In certain embodiments, the one or more polymeric materials comprise a modulus of elasticity no greater than about 90%, about 80%, about 70%, about 60%, about 50%, or about 40% of a modulus of elasticity of the glass material of the optical fiber.

Since pressure may be calculated as force divided by area, a reduction in contact area tends to increase the amount of applied pressure for a given force, and vice-versa. Similarly, if it is desired to reduce the amount of force required to obtain a specific contact pressure, then reducing the contact area along a front surface of a polymeric end face may be a desirable alternative. Use of precise material deposition and/or curing process steps as disclosed herein (e.g., 3D printing, focused laser curing, micromold assisted curing, etc.) may provide a basis for tailoring surface shapes and/or surface features of polymeric end faces configured to provide physical contact through an optical interface, to enable transmission of optical signals to and/or from at least one optical fiber of a fiber optic connector disclosed herein.

Certain embodiments of the present disclosure include surface shapes and/or surface features of polymeric end faces configured to create a physical contact condition with another mating surface to permit transmission of optical signals to and/or from optical fibers to accommodate the use of multi-core optical fibers with fiber optic connectors as disclosed herein. One such embodiment is disclosed in connection with FIGS. 14-16.

Figure 14:
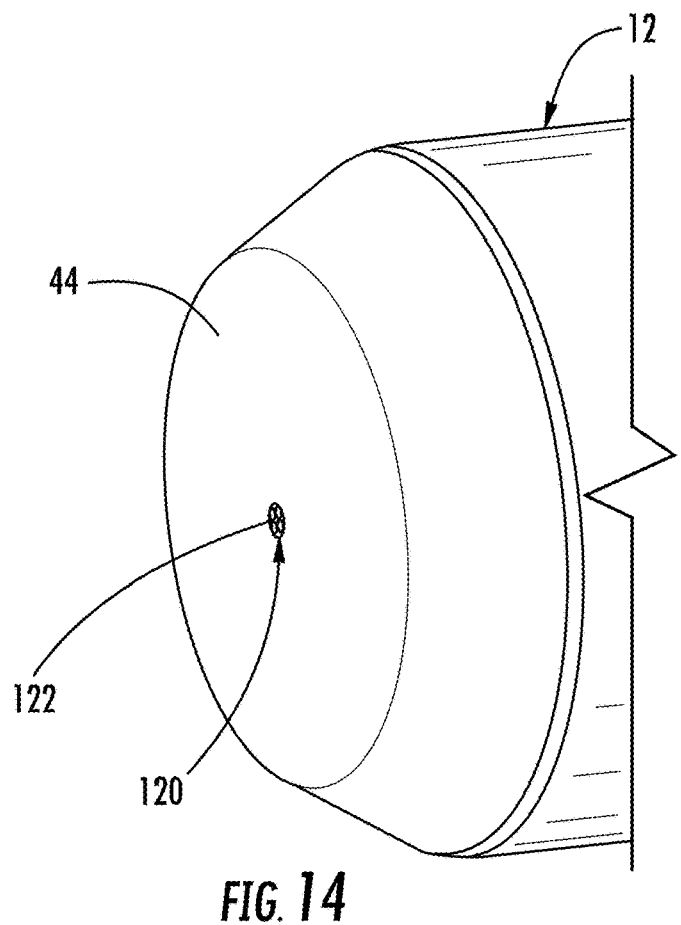
FIG. 14 is a perspective view of a front end portion of a ferrule containing a multi-core optical fiber, with a polymeric material arranged between terminal ends of the optical fibers and an end of the ferrule.
Figure 15:
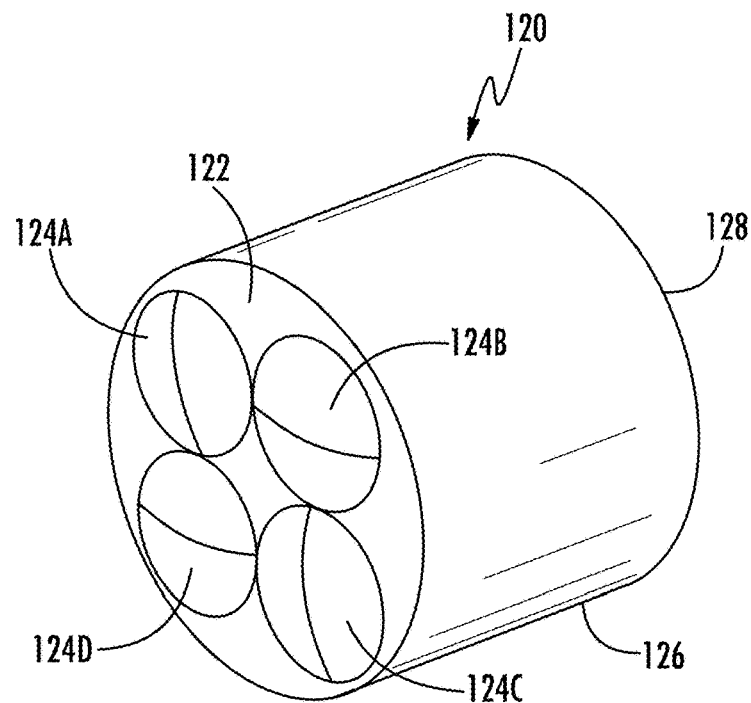
FIG. 15 is a magnified perspective view of the front end portion and polymeric material of FIG. 14, showing outwardly protruding dome-shaped compression bumps each configured to be registered with an individual fiber of a multi-core optical fiber.

FIG. 14 is a perspective view of a front portion of a ferrule 12 that contains a multi-core optical fiber (not shown), with a polymeric material (shown in more detail in FIG. 15) arranged between a terminal end of the multi-core optical fiber and a front end 44 of the ferrule 12. The polymeric material includes a front end face 122 and also defines features extending beyond the front end 44 of the ferrule 12. FIG. 15 is a magnified perspective view of the polymeric material 120 that defines the front end face 122 shown in FIG. 14. As shown in FIG. 15, the front end face 122 of the polymeric material 120 includes four compression bumps 124A-124D (also known as compression spots) that are dome-shaped (convex) and protrude forward relative to the front end face 122. The polymeric material 120 further includes a lateral (cylindrical) boundary 126 that may be arranged to contact the end portion of an internal bore of a ferrule (e.g., ferrule 12 shown in FIG. 14). The polymeric material 120 further includes a rear face 128 suitable for contacting a terminal end of a bare optical fiber (not shown). Each dome-shaped compression bump 124A-124D is configured to be registered (e.g., aligned along a central axis) with an individual core of a multi-core optical fiber. Although the polymeric material 120 of FIG. 15 is illustrated in a stand-alone state, it is to be appreciated that in preferred embodiments, the polymeric material 120 may be fabricated in an end portion of a ferrule (e.g., by applying polymeric material in a flowable form to an end portion of an internal bore containing an optical fiber, followed by curing, or by any other methods disclosed herein).

Figure 16:
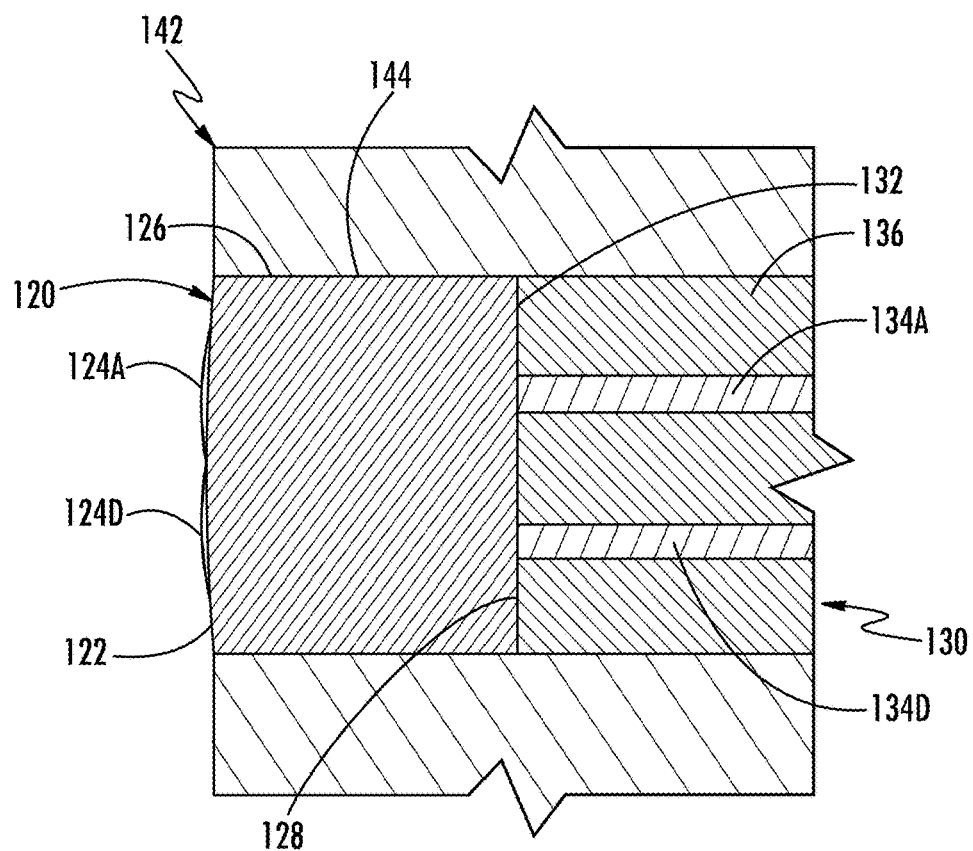
FIG. 16 is a cross-sectional view of the polymeric material of FIG. 15 abutting a terminal end of a multi-core optical fiber within an internal bore of the ferrule, with individual cores of the multi-core optical fiber being registered with different dome-shaped compression bumps of the polymeric material.

FIG. 16 is a cross-sectional view of the polymeric material 120 of FIG. 15 arranged within an internal bore 144 of a ferrule 142. The lateral boundary 126 of the polymeric material 120 is arranged in contact with the internal bore 144 of the ferrule 142, and the rear face 128 of the polymeric material 120 is arranged in contact with a terminal end 132 of a multi-core optical fiber 130 retained by the ferrule 142. The multi-core optical fiber 130 includes fiber cores 134A-134D that are distributed within a surrounding glass material 136. As shown, individual fiber cores 134A, 134D of the multi-core optical fiber 130 are registered with different dome-shaped compression bumps 124A, 124D of the polymeric material 120. Relative to a hypothetical device with a flat end face lacking the compression bumps 124A-124D, presence of the compression bumps 124A-124D extending forward from the front face 122 enables a smaller force to be applied to achieve a desired interface pressure between contacting polymeric end faces of mating connectors. Additionally, presence of the compression bumps 124A-124D registered with individual fiber cores 134A-134D of the multi-core optical fiber 130 may provide preferential transmission paths for optical signals from individual cores of one multi-fiber cable to individual cores of another multi-fiber cable (not shown).

In certain embodiments, polymeric materials arranged in contact with the terminal ends of optical fibers may include one or more waveguide regions that are laterally embedded in a surrounding material, with each waveguide region being configured to guide light signals from a terminal end of an optical fiber to a polymeric material outer end face. Presence of waveguide regions serves to reduce insertion losses for optical signals transmitted through polymeric material assemblies, and further enables parallel transmission of multiple optical signals (e.g., through a multi-core optical fiber) with reduction or elimination of cross-talk. Preferably, a waveguide material of a waveguide region has a first refractive index and a surrounding material has a second refractive index that differs from the first refractive index. In certain embodiments, at least one of the waveguide material or the surrounding material may include OrmoStamp™ hybrid polymer material (having a refractive index of 1.504) or OrmoClear™ hybrid polymer material (having a refractive index of 1.538), with both of the foregoing materials being commercially available from Micro Resist Technology GmbH (Berlin, Germany). Other materials may be used, including materials having refractive index values differing from the foregoing values.

In certain embodiments, each waveguide region includes a transition portion having a variable cross-sectional diameter (e.g., forming a conical or frustoconical shape), and a waveguiding portion having a cross-sectional diameter that is smaller than an average cross-sectional diameter of the transition portion. The variable cross-sectional diameter of the transition portion may be tapered (e.g., linear or non-linear), configured to match an optical mode in a polymer waveguide to a fiber mode in the optical fiber, and/or optimized to reduce insertion loss. The waveguiding portion may include a cross-sectional diameter that is substantially constant, or that is variable in character (i.e., having a diameter that varies with respect to position). Each transition portion may be arranged proximate to an end face of an optical fiber and/or an individual core of a multi-core optical fiber. In certain embodiments, an end face of each transition portion has a larger diameter than a diameter of an optical core (or optical fiber) arranged to abut the transition portion. An exemplary method for forming a waveguide region that includes a waveguide material and a surrounding material may embody or include three-dimensional printing. Optionally, at least one waveguide region may be formed in a first step (e.g., a first 3D printing step), and the surrounding material may be formed in a second step (e.g., a second 3D printing step) to laterally surround the at least one waveguide region. When at least one first waveguide region is provided in an end portion of at least one internal bore of a first ferrule of a first connector, the at least one first waveguide region may be configured to mate with at least one second waveguide region provided in an end portion of at least one internal bore of a second ferrule of a second connector to provide at least one signal transmission path therebetween. In certain embodiments, multiple waveguide regions may be provided in an end portion of a single bore of a ferrule configured to receive a multi-core optical fiber, with each waveguide region being registered with a terminal end of a different core of the multi-core optical fiber.

Figure 17:
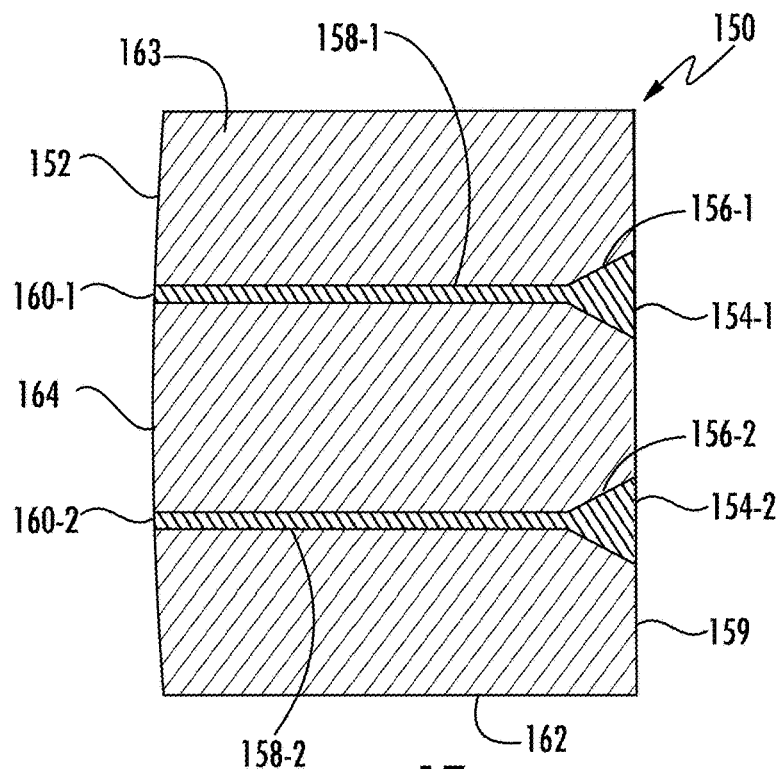
FIG. 17 is a cross-sectional view of a polymeric material assembly suitable for fabrication in an internal bore of a ferrule and arranged to abut a terminal end of a multi-core optical fiber, with the polymeric material assembly including waveguide material shaped into multiple waveguide regions and including surrounding material arranged to laterally embed the waveguide regions.
Figure 18:
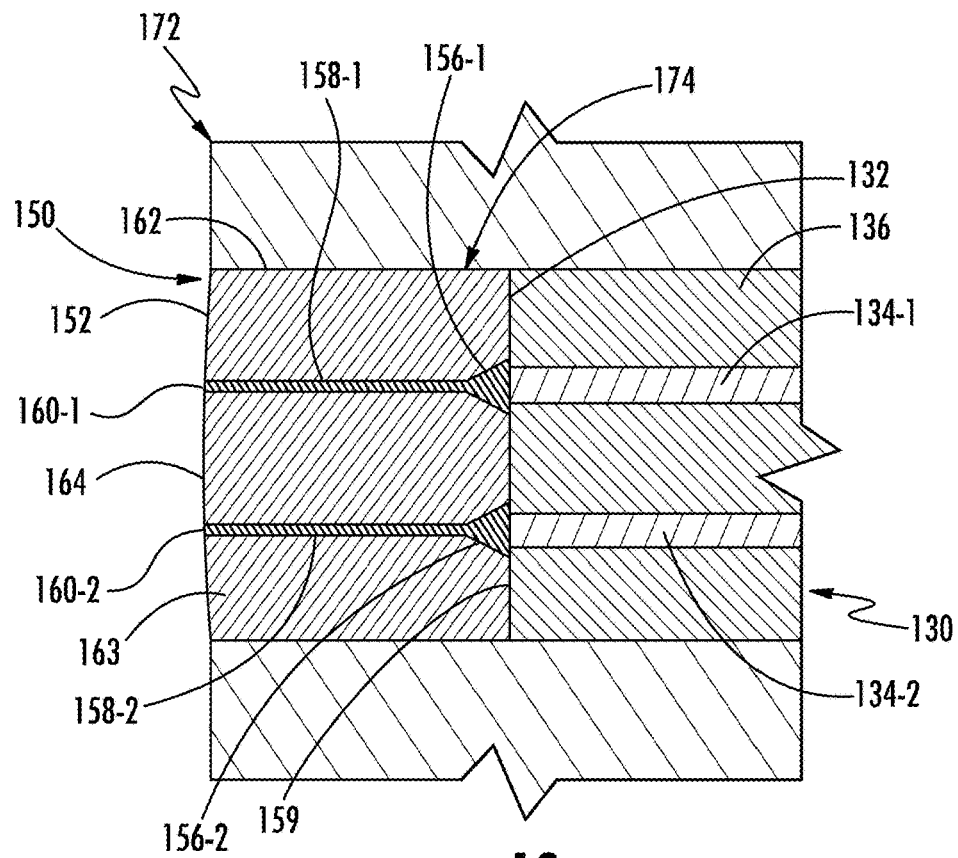
FIG. 18 is a cross-sectional view of the polymeric material assembly of FIG. 17 abutting the terminal end of the multi-core optical fiber in the internal bore of the ferrule, with the waveguide regions extending between an outer face of the polymeric material assembly and terminal ends of different optical fiber cores.
Figure 19:
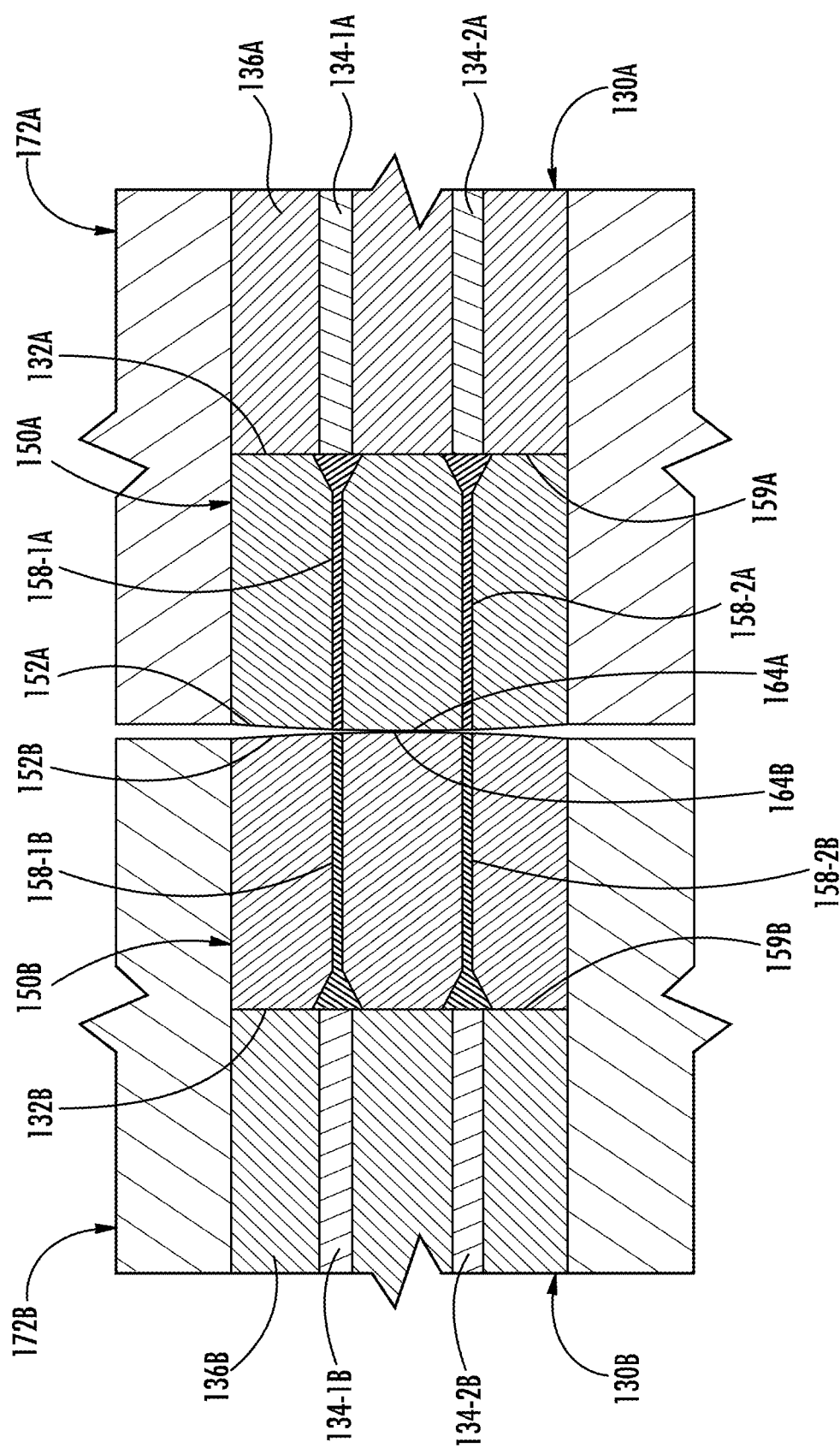
FIG. 19 is a cross-sectional view of end portions of two ferrules according to FIG. 18 arranged to be mated with one another, with waveguide regions of a polymeric material assembly of the first ferrule abutting and being registered with waveguide regions of a polymeric material assembly of the second ferrule, and being configured to transmit optical signals from individual optical fiber cores of a first multi-core optical fiber to individual fiber cores of a second multi-core optical fiber.

FIG. 17 is a cross-sectional view of a polymeric material assembly 150 suitable for fabrication in an internal bore of a ferrule. The polymeric material assembly 150 includes an inner face 159 configured to abut a terminal end of a multi-core optical fiber (e.g., as shown in FIG. 18), and includes an outer end face 152 configured to be positioned proximate to an end face of a polymeric material assembly associated with another ferrule (e.g., as shown in FIG. 19). With continued reference to FIG. 17, a lateral boundary 162 of the polymeric material assembly 150, which may be substantially cylindrical in shape, is arranged to contact an inner surface defining an internal bore of a ferrule (not shown). The polymeric material assembly 150 includes waveguide material shaped into first and second waveguide regions 158-1, 158-2 that are laterally embedded in a surrounding material 163. The first and second waveguide regions 158-1, 158-2 each extend between the inner face 159 and the outer end face 152. Each waveguide region 158-1, 158-2 includes a transition portion 156-1, 156-2 having a variable cross-sectional diameter (e.g., forming a conical or frustoconical shape). Each waveguide region 158-1, 158-2 also includes a waveguiding portion 160-1, 160-2 having a substantially constant cross-sectional diameter that is smaller than an average cross-sectional diameter of the corresponding transition portion 156-1, 156-2. As shown in FIG. 17, each transition portion 156-1, 156-2 has a larger diameter end 154-1, 154-2 proximate to the inner face 159 of the polymeric material assembly 150. Each transition portion 156-1, 1-56-2 also has a diameter that tapers with distance away from the inner face 159 to contact the corresponding waveguiding portion 160-1, 160-2. Each waveguiding portion 160-1, 160-2 extends between the corresponding transition portion 156-1, 156-2 (at a smaller diameter end thereof) and the outer end face 152 of the polymeric material assembly 150. As shown, the outer end face 152 of the polymeric material assembly 150 includes a central surface portion 164 that protrudes slightly outward relative to peripheral portions of the outer end face 152, such that the outer end face 152 may be convex in shape. In certain embodiments, the polymeric material assembly 150 is subject to being elastically deformed when the outer end face 152 is compressed against a mating surface (e.g., of another connector (not shown)). In this regard, the slight protrusion of the central surface portion 164 relative to a peripheral remainder of the outer end face 152 accommodates deformation when the outer end face 152 of the polymeric material assembly 150 is pressed against such a mating surface.

FIG. 18 is a cross-sectional view of the polymeric material assembly 150 of FIG. 17 abutting a terminal end 132 of a multi-core optical fiber 130 in the internal bore of a ferrule 172. For the sake of brevity, descriptions of various elements of the polymeric material assembly 150 previously recited in connection with FIG. 17 are incorporated by reference with respect to FIG. 18. As shown in FIG. 18, the inner face 159 of the polymeric material assembly 150 is arranged in contact with the terminal end 132 of the multi-core optical fiber 130. Each waveguide region 158-1, 158-2 of the polymeric material assembly 150 extends between a terminal end of a different fiber core 134-1, 134-2 and the outer end face 152 (encompassing an outwardly protruding central portion 164) of the polymeric material assembly 150. As further shown in FIG. 18, each waveguide region 158-1, 158-2 includes the corresponding transition portion 156-1, 156-2 having a frustoconical shape with a larger diameter end abutting an end of the corresponding fiber core 134-1, 134-2 of the multi-core optical fiber 130. Additionally, the larger diameter end of each transition portion 156-1, 156-2 includes a diameter that exceeds a diameter of the adjacent fiber core 134-1, 134-2. The fiber cores 134-1, 134-2 are distributed within a surrounding glass material 136. Each transition portion 156-1, 156-2 is configured to convey optical signals received from a corresponding fiber core 134-1, 134-2 to a waveguiding portion 160-1, 160-2 associated with the respective transition portion 156-1, 156-2.

FIG. 19 is a cross-sectional view of end portions of first and second ferrules 172A, 172B (each embodying features according to the ferrule 172 of FIG. 18) arranged to be mated with one another. Each ferrule 172A, 172B contains a multi-core optical fiber 130A, 130B having multiple fiber cores 134-1A, 134-2A, 134-1B, 134-2B distributed within a surrounding glass material 136A, 136B. Each ferrule 172A, 172B also contains a polymeric material assembly 150A, 150B that includes a waveguide region 158-1A, 158-2A, 158-1B, 158-2B. Each waveguide region 158-1A, 158-2A, 158-1B, 158-2B is registered with a corresponding optical fiber core 134-1A, 134-2A, 134-1B, 134-2B, with an inner face 159A, 159B of each polymeric material assembly 150A, 150B arranged in contact with a terminal end 132A, 132B of the corresponding multi-core optical fiber 130A, 130B. As shown, outwardly-protruding central surface portions 164A, 164B of the polymeric material assemblies 150A, 150B are arranged in contact with one another, whereas peripheral remainders of outer end faces 152A, 152B are not yet arranged in contact with one another. Following application of compressive force to the ferrules 172A, 172B, end portions of the polymeric material assemblies 150A, 150B may be deformed to provide continuous contact between the peripheral remainders of the outer end faces 152A, 152B.

In operation of the first and second ferrules 172A, 172B, optical signals may be transmitted from fiber cores 134-1A, 134-2A of the first ferrule 172A into waveguide regions 158-1A, 158-2A of the first polymeric material assembly 150A, then into waveguide regions 158-1B, 158-2B of the second polymeric material assembly 150B, and into fiber cores 134-1B, 134-2B of the second ferrule 172B. Additional optical signals may be transmitted in the reverse direction. Utilization of the polymeric material assemblies 150A, 150B with corresponding waveguide regions 158-1A, 158-2A, 158-1B, 158-2B permits optical signals to be transmitted between fiber cores 134-1A, 134-2A, 134-1B, 134-2B of multi-core optical fibers 130A, 130B with reduced crosstalk and reduced insertion loss. Additionally, utilization of the polymeric material assemblies 150A, 150B permits optical communication with low insertion losses without necessitating polishing of terminal ends 132A, 132B of the multi-core optical fibers 130A, 130B.

Figure 20:
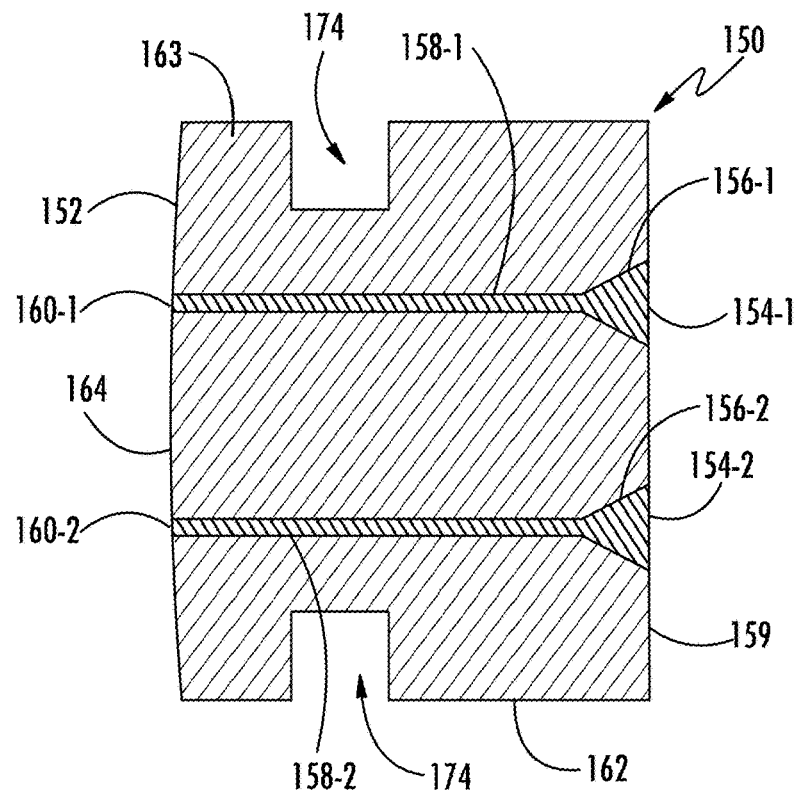
FIG. 20 is a cross-sectional view of a prefabricated polymeric material assembly suitable for insertion in an internal bore of a ferrule and arranged to abut a terminal end of a multi-core optical fiber, with the prefabricated polymeric material assembly including waveguide material shaped into multiple waveguide regions and including surrounding material arranged to laterally embed the waveguide regions and define a groove to receive adhesive material for attachment of the prefabricated polymeric material assembly within the internal bore of the ferrule.

FIG. 20 is a cross-sectional view of a prefabricated polymeric material assembly 150 suitable for fabrication in an internal bore of a ferrule. For the sake of brevity, descriptions of various elements of the polymeric material assembly 150 previously recited in connection with FIG. 17 are incorporated by reference with respect to FIG. 20, except where otherwise noted.

The prefabricated polymeric material assembly 150 is configured for insertion into the internal bore 19 of the ferrule 172 (shown in FIG. 21; discussed in more detail below). To facilitate retention of the prefabricated polymeric material 150 assembly within the ferrule 172, the prefabricated polymeric material assembly 150 includes a groove 174 (also referred to as a chamber, cavity, recess, etc.) positioned along a perimeter of the polymeric material to receive an adhesive therein. In certain embodiments, the groove 174 may including one or more segments forming a generally annular ring shape, wherein such segment(s) may be continuous or non-continuous in character. In certain embodiments, the groove 174 may comprise one or more chambers, such as two chambers positioned on different lateral sides or sidewall portions of the polymeric material.

Figure 21:
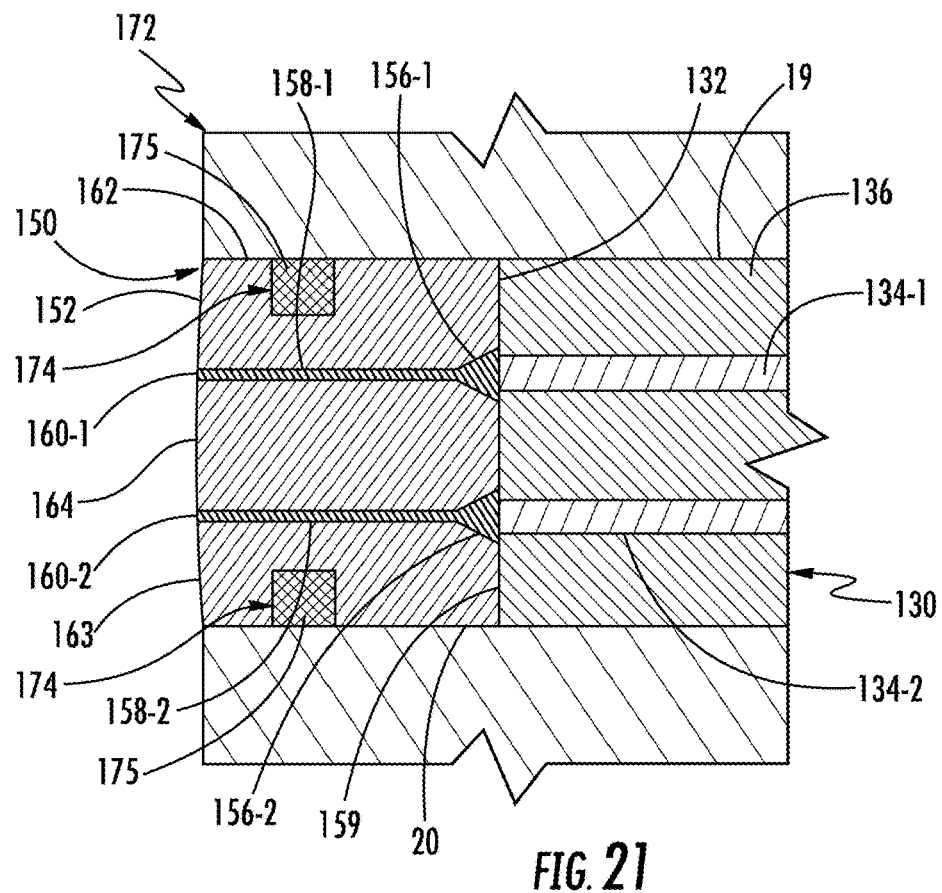
FIG. 21 is a cross-sectional view of the prefabricated polymeric material assembly of FIG. 20 abutting the terminal end of the multi-core optical fiber in the internal bore of the ferrule, with the waveguide regions extending between an outer face of the prefabricated polymeric material assembly and terminal ends of different optical fiber cores of the multi-core optical fiber, and with the adhesive material positioned in the groove.

FIG. 21 is a cross-sectional view of the prefabricated polymeric material assembly 150 of FIG. 20 abutting a terminal end 132 of a multi-core optical fiber 130 in the internal bore 19 of the ferrule 172. For the sake of brevity, descriptions of various elements of the polymeric material assembly 150 previously recited in connection with FIG. 20 are incorporated by reference with respect to FIG. 21. Further, descriptions of similar elements discussed in FIG. 18 are incorporated by reference with respect to FIG. 21.

As shown, the prefabricated polymeric material assembly 150 is configured for insertion into the recess 70 of the internal bore 19 of the ferrule 172. In particular, the groove 174 is configured to be filled with liquid adhesive 175 (e.g., epoxy). Accordingly, once the prefabricated polymeric material assembly 150 is inserted into and positioned within the internal bore 19 of the ferrule 172, UV light is applied to activate (e.g., crosslink) the liquid adhesive 175 to bond the prefabricated polymeric material assembly 150 to the ferrule 172.

Figure 22:
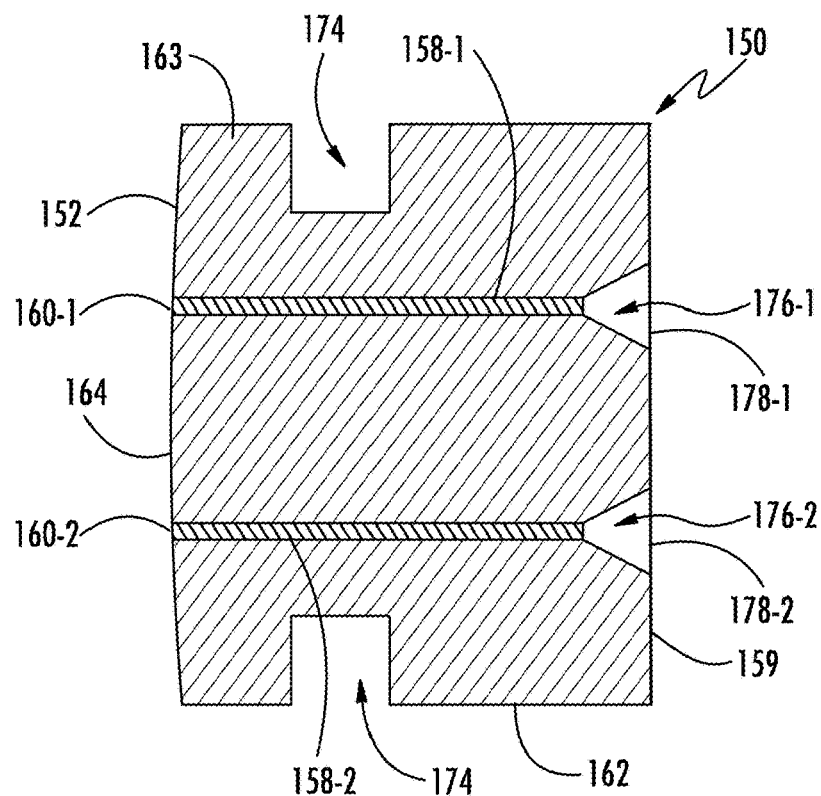
FIG. 22 is a cross-sectional view of another embodiment of a prefabricated polymeric material assembly suitable for insertion in an internal bore of a ferrule and arranged to abut a terminal end of a multi-core optical fiber, with the prefabricated polymeric material assembly including waveguide material shaped into multiple waveguide regions and including surrounding material arranged to laterally embed the waveguide regions and define a groove and a plurality of cavities configured to receive adhesive material for attachment of the prefabricated polymeric material assembly within the internal bore of the ferrule.

FIG. 22 is a cross-sectional view of another embodiment of a prefabricated polymeric material assembly 150 suitable for fabrication in an internal bore of a ferrule. For the sake of brevity, descriptions of various elements of the polymeric material assembly 150 previously recited in connection with FIGS. 17 and 20 are incorporated by reference with respect to FIG. 22, except where otherwise noted.

The prefabricated polymeric material assembly 150 in the embodiment of FIG. 22 is still configured for insertion into the internal bore 19 of the ferrule 172 (shown in FIG. 23; discussed in more detail below). To facilitate assembly therebetween, the prefabricated polymeric material assembly 150 includes the groove 174 (discussed above) as well as a plurality of cavities 176-1, 176-2 defined in the inner face 159 thereof. Each cavity 176-1, 176-2 has a variable cross-sectional diameter (e.g., forming a conical or frusto-conical shape). Unlike the polymeric material assembly 150 of FIGS. 17 and 20, the first and second waveguide regions 158-1, 158-2 only include waveguiding portions 160-1, 160-2 (and not transition portions 156-1, 156-2). In this way, the first and second waveguide regions 158-1, 158-2 each extend from the outer end face 152 to the plurality of cavities 176-1, 176-2, where each cavity 176-1, 176-2 is generally aligned with the first and second waveguide regions 158-1, 158-2, respectively. Each cavity 176-1, 176-2 has a larger diameter end 178-1, 178-2 proximate to the inner face 159 of the prefabricated polymeric material assembly 150. Each cavity 176-1, 176-2 also has a diameter that tapers with distance away from the inner face 159 to contact the corresponding waveguiding portion 160-1, 160-2. Each waveguiding portion 160-1, 160-2 extends between the corresponding cavity 176-1, 176-2 (at a smaller diameter end thereof) and the outer end face 152 of the prefabricated polymeric material assembly 150.

Figure 23:
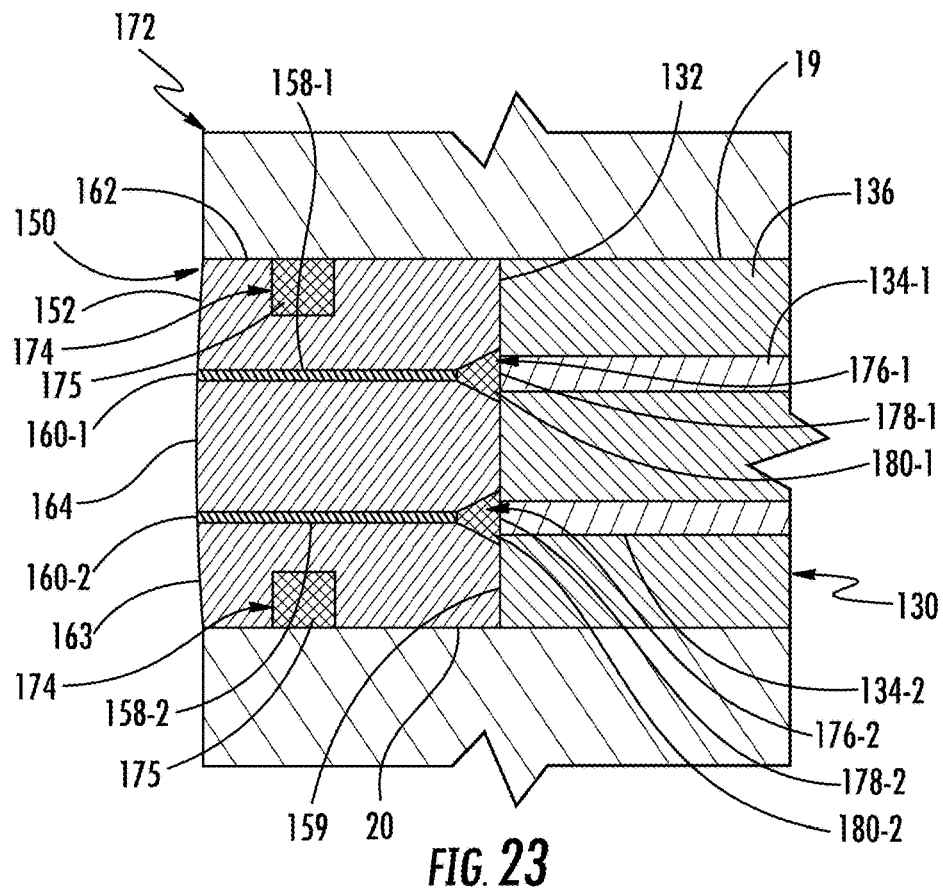
FIG. 23 is a cross-sectional view of the prefabricated polymeric material assembly of FIG. 22 abutting the terminal end of the multi-core optical fiber in the internal bore of the ferrule, with the waveguide regions extending from an outer face of the prefabricated polymeric material assembly, and with the adhesive material positioned in the groove and the plurality of cavities arranged between the waveguide regions and terminal ends of optical fiber cores of the multi-core optical fiber.

FIG. 23 is a cross-sectional view of the prefabricated polymeric material assembly 150 of FIG. 22 abutting a terminal end 132 of a multi-core optical fiber 130 in the internal bore 19 of the ferrule 172. For the sake of brevity, descriptions of various elements of the polymeric material assembly 150 previously recited in connection with FIG. 22 are incorporated by reference with respect to FIG. 23. Further, descriptions of similar elements discussed in FIGS. 18 and 21 are incorporated by reference with respect to FIG. 23.

As shown, the prefabricated polymeric material assembly 150 is configured for insertion into the recess 70 of the internal bore 19 of the ferrule 172. In particular, the groove 174 is configured to be filled with liquid adhesive 175 (e.g., epoxy), and the cavities 176-1, 176-2 are configured to be filled with a liquid, curable polymer material 180-1, 180-2 (e.g., an inorganic-organic hybrid polymer such as described in the examples discussed above, and optionally the same material as (or a material similar to) the material of the prefabricated polymeric material assembly 150). Accordingly, once the prefabricated polymeric material assembly 150 is inserted into and positioned within the internal bore 19 of the ferrule 172, UV light is applied to activate (e.g., crosslink) the liquid adhesive 175 to bond the prefabricated polymeric material assembly 150 to the ferrule 172. Additionally, the UV light serves to bond the prefabricated polymeric material assembly 150 to the fiber cores 134-1, 134-2. Accordingly, the fiber cores 134-1, 134-2 are bonded to the first and second wave guide regions 158-1, 158-2.

In certain embodiments, fiber optic connectors and fabrication methods disclosed herein may apply to multiple fibers (e.g., multi-fiber cables).

Figure 24:
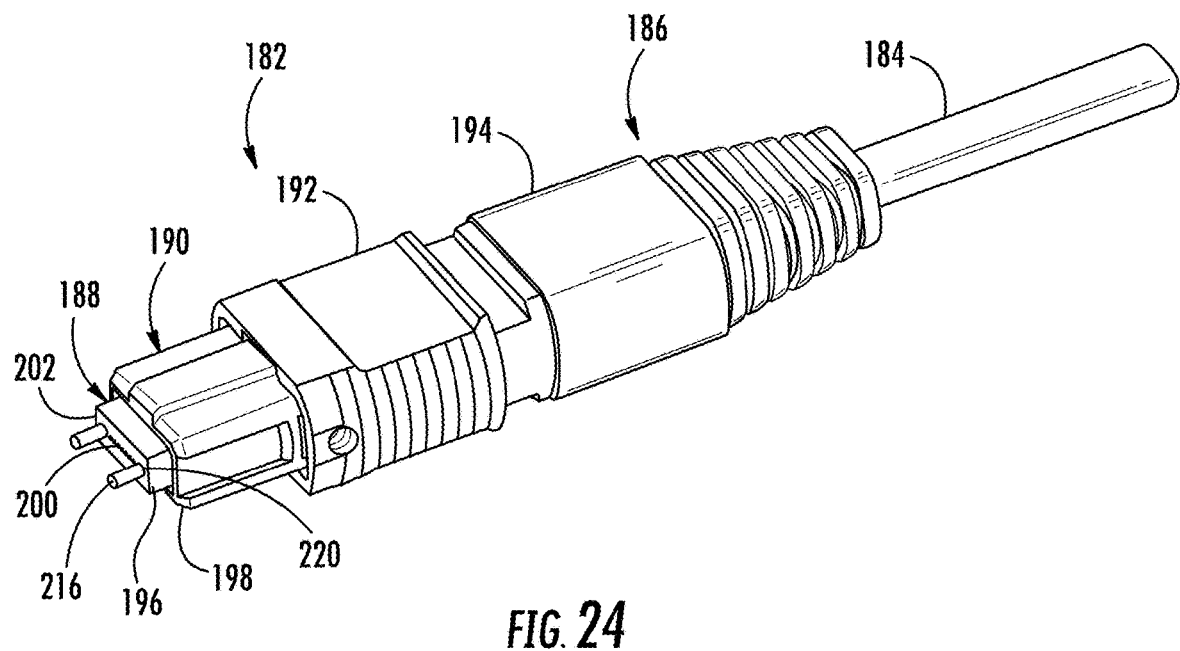
FIG. 24 is a perspective view of a fiber optic connector and an associated fiber optic cable forming a fiber optic cable assembly, with the fiber optic connector including a multi-fiber ferrule with a single ferrule boot.
Figure 25:
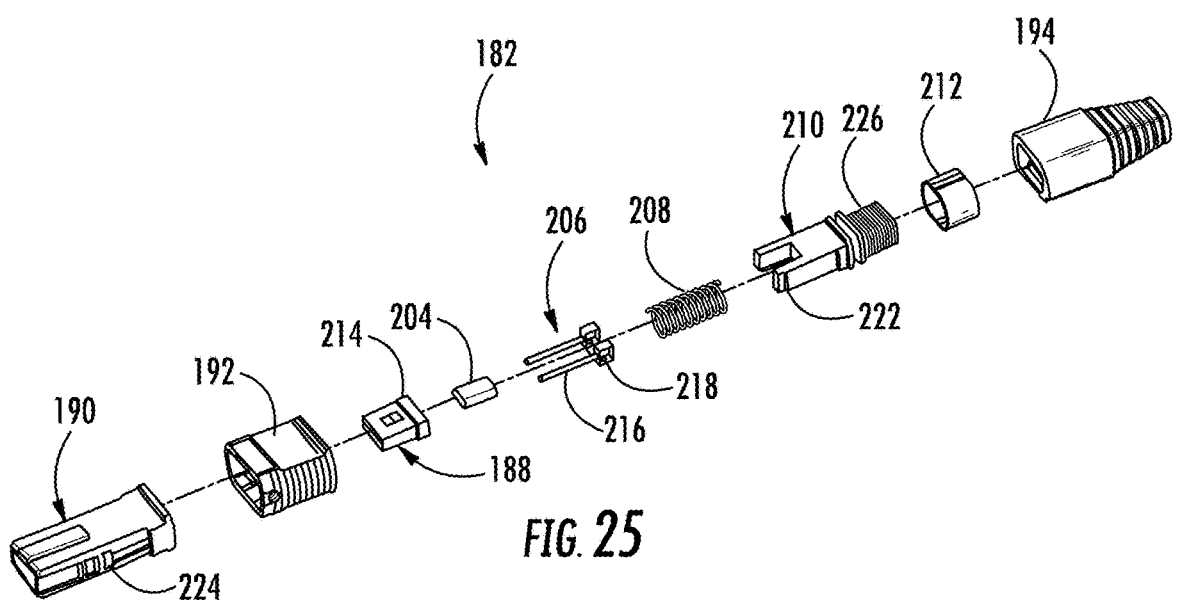
FIG. 25 is an exploded perspective view of the fiber optic cable assembly of FIG. 24.

FIGS. 24 and 25 are views of a fiber optic connector and an associated fiber optic cable forming a fiber optic cable assembly, with the fiber optic connector including a multi-fiber ferrule with a single ferrule boot. Persons skilled in the field of optical connectivity will appreciate that the connector 182 is merely an example, and that the general principles disclosed with respect to the multi-fiber ferrules and other components may also be applicable to other connector designs.

As shown in FIG. 24, the connector 182 may be installed on a fiber optic cable 184 ("cable") to form a fiber optic cable assembly 186. The connector 182 includes a ferrule 188, a housing 190 received over the ferrule 188, a slider 192 received over the housing 190, and a boot 194 received over the cable 184. The ferrule 188 is spring-biased within the housing 190 so that a front portion 196 of the ferrule 188 extends beyond a front end 198 of the housing 190. Optical fibers (not shown) carried by the cable 184 extend through bores 200 (also referred to as micro-holes) defined in the ferrule 188 before terminating at or near a front end face 202 of the ferrule 188. The optical fibers are restrained within the ferrule 188 as described above, such as by using an adhesive material (e.g., epoxy). The optical fibers can be presented for optical coupling with optical fibers of a mating component (e.g., another fiber optic connector; not shown) when the housing 190 is inserted into an adapter, receptacle, or the like.

As shown in FIG. 25, the connector 182 also includes a ferrule boot 204, guide pin assembly 206, spring 208, crimp body 210, and crimp ring 212. The ferrule boot 204, which is unitary in character, is received in a rear portion 214 of the ferrule 188 to help support the optical fibers extending to the ferrule bores 200 (shown in FIG. 24). In particular, optical fibers extend through an aperture (not shown) defined through the ferrule boot 204. The guide pin assembly 206 includes a pair of guide pins 216 extending from a pin keeper 218. Features on the pin keeper 218 cooperate with features on the guide pins 216 to retain portions of the guide pins 216 within the pin keeper 218. When the connector 182 is assembled, the pin keeper 218 is positioned against a back surface of the ferrule 188, and the guide pins 216 extend through pin holes 220 (shown in FIG. 24) provided in the ferrule 188 so as to project beyond the front end face 202 of the ferrule 188.

Both the ferrule 188 and guide pin assembly 206 are biased to a forward position relative to the housing 190 by the spring 208. More specifically, the spring 208 is positioned between the pin keeper 218 and a portion of the crimp body 210. The crimp body 210 is inserted into the housing 190 when the connector 182 is assembled and includes latching arms 222 that engage recesses 224 in the housing 190. The spring 208 is compressed by this point and exerts a biasing force on the ferrule 188 via the pin keeper 218. The rear portion 214 of the ferrule 188 defines a flange that interacts with a shoulder or stop formed within the housing 190 to retain the rear portion 214 of the ferrule 188 within the housing 190. The rear portion 214 of the ferrule 188 also includes a recess (not shown) configured to receive at least a front portion of the ferrule boot 204.

In a manner not shown in the figures, aramid yarn or other strength members from the cable 184 are positioned over an end portion 226 of the crimp body 210 that projects rearwardly from the housing 190. The aramid yarn is secured to the end portion 226 by the crimp ring 212, which is slid over the end portion 226 and deformed after positioning the aramid yarn. The boot 194 covers this region, as shown in FIG. 24, and provides strain relief for optical fibers emanating from the fiber optic cable 184 by limiting the extent to which the connector 182 can bend relative to the fiber optic cable 184.

Although the ferrule 188 includes a surface embodying a flat front end face 202, in certain embodiments, one or more portions of the front end face 202 may protrude forwardly from such a surface to form one or more pedestals through which multiple bores (such as bores 200 shown in FIG. 24) extend. Similarly, although the front end face 202 of the ferrule 188 shown in FIG. 24 includes multiple bores 200 that are equally spaced to form a one-dimensional array, in certain embodiments, multiple groups of bores may extend through a front end face with one or more solid regions, free of bores, provided between such groups of bores. Additionally, in certain embodiments, multiple rows of bores may be provided.

Figure 26:
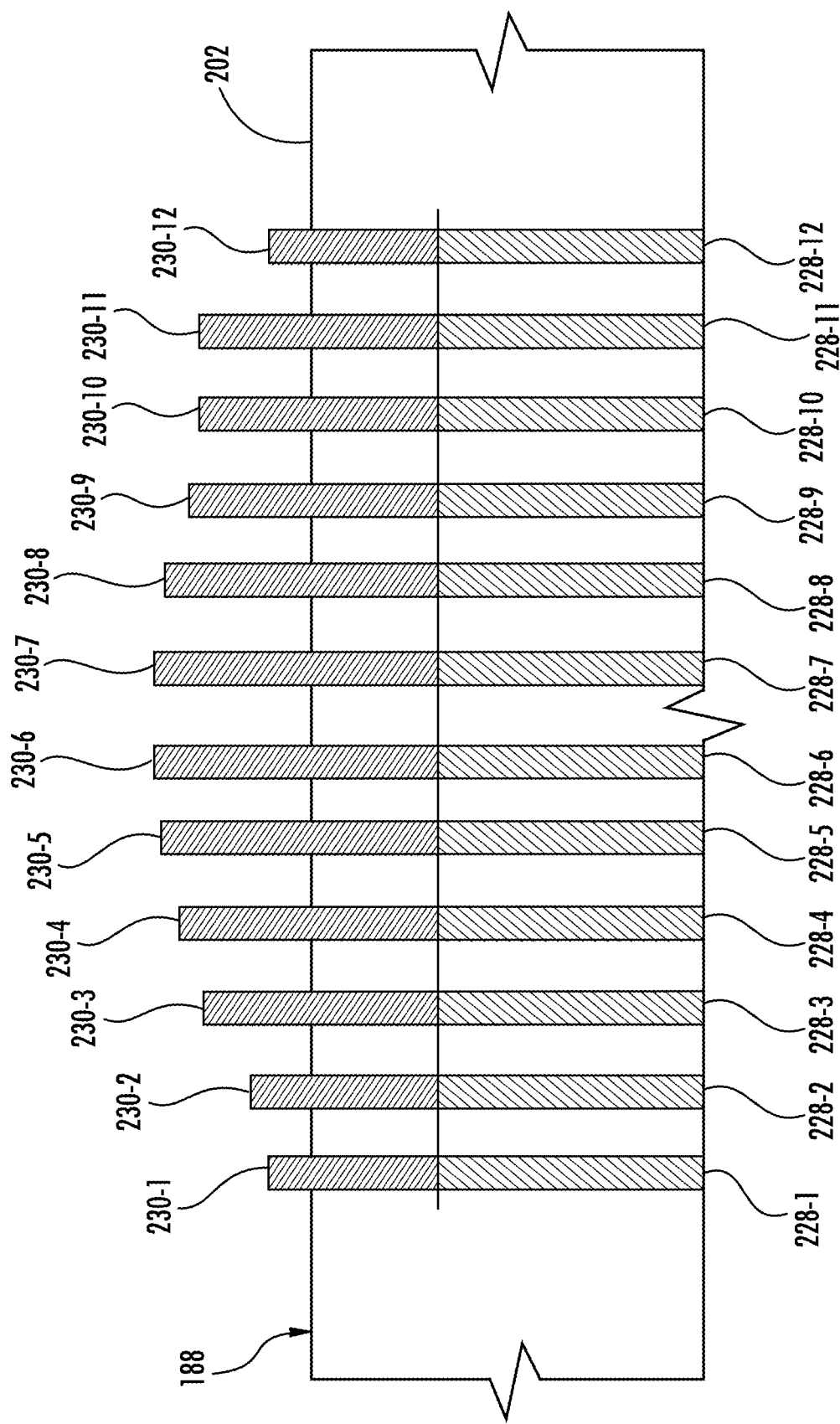
FIG. 26 is a cross-sectional view of a multi-fiber ferrule with polymeric material protrusions of different lengths.

FIG. 26 is a cross-sectional view of the multi-fiber ferrule 188 with polymeric material protrusions 230-1 to 230-12 (which may also be referred to as compression bumps, compression spots, etc.) of different lengths (aligned with optical fibers 228-1 to 228-12 and extending outward past the front end face 202 at different distances (also referred to as protrusion heights). In particular, the length of each polymeric material protrusion 230-1 to 230-12 (and resulting protrusion height) may depend on the compression force. For example, for ferrules of an MPO connector, the inner optical fibers experience a different (e.g., decreased) compression force than the outer optical fibers. Multi-fiber ferrule 188 may compensate for this difference by varying the protrusion height profile of the polymeric material protrusions 230-1 to 230-12. As an example, the protrusion height profile of the polymeric material protrusions 230-1 to 230-12 may be varied such that the outer polymeric material protrusions 230-1 and 230-12 are shorter than the inner polymeric material protrusions 230-6 and 230-7 (and, therefore, have shorter protrusion heights), so that the inner polymeric material protrusions 230-6 and 230-7 will experience substantially the same compression force as the outer polymeric material protrusions 230-1 and 230-12. This is difficult, if even possible, for ferrules with multiple optical fibers that have been processed (e.g., cleaved and/or polished) as a group for optical communication. Although the foregoing example referred to a goal of providing substantially uniform compression force for different optical fibers, it is to be appreciated that principle described herein may be utilized to provide any desired profile of compression force with respect to position of individual optical fibers associated with a multi-fiber ferrule or similar element.

Utilization of waveguiding regions within polymeric material assemblies configured to provide physical contact through an optical interface may reduce insertion loss, such that a distance between terminal ends of optical fibers (or optical fiber cores thereof) may be increased relative to the use of polymeric materials lacking waveguide regions while still providing acceptably low insertion losses. For example, polymeric material assemblies incorporating waveguide regions registered with overlying terminal ends of optical fibers (or optical fiber cores thereof) may have lengths in a range of from about 0.5 μm to about 50 μm without introducing excessive insertion losses. Accordingly, in certain embodiments, polymeric material regions overlying terminal ends of optical fibers may have lengths in a range of from about 0.5 μm to about 50 μm.

At least certain embodiments of the present disclosure directed to fabrication methods may provide technical benefits including one or more of the following: (A) eliminating the need to polish terminal ends of optical fibers utilized in fiber optic connectors while still providing physical contact through an optical interface; (B) allowing precise and controlled shape generation to create end faces suitable for making physical contact through an optical interface; (C) eliminating the need to precisely cut optical fiber ends to allow creation of angled end faces suitable for providing physical contact through an optical interface; (D) enabling creation and adjustment of protrusions and undercuts for appropriate requirements within tolerances smaller than may be obtained by conventional glass processing techniques; (E) enabling reduction in tolerances for centering of terminal ends of optical fibers; (F) enabling process automation for single-fiber and multi-fiber connectors; and/or (G) enabling adjustment of the height of end faces (e.g., to provide substantially uniform compression force, or any desired profile of compression force with respect to position of individual optical fibers).

At least certain embodiments of the present disclosure directed to products (e.g., fiber optic connectors) may provide technical benefits including one or more of the following: (A) enabling reduction of compressive mechanical loads required to provide physical contact of end faces of connectors incorporating optical fibers; (B) increasing uniformity of optical fiber end face shapes and conditions in nanometer scale; (C) enabling of reduced insertion losses; (D) increasing reliability of connections, with particular relevance to multi-core optical fibers; (E) enabling formation of functional regions such as scratch resistance layers, anti-reflection layers, anti-static layers, and/or lens regions between a terminal end of an optical fiber and an end face that provides physical contact through an optical interface.

Those skilled in the art will appreciate that other modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred. Moreover, where a method claim below does not explicitly recite a step mentioned in the description above, it should not be assumed that the step is required by the claim.

What is claimed is:

1. A fiber optic connector comprising:
a ferrule including a front end for optical coupling with a mating component, a rear end, and at least one internal bore extending between the front end and the rear end;
at least one optical fiber extending from behind the rear end of the ferrule and through the rear end of the ferrule into the at least one internal bore, the at least one optical fiber including a terminal end positioned between the front end and the rear end of the ferrule;
wherein the terminal end is positioned between the front end and the rear end of the ferrule when the terminal end of the at least one optical fiber is retracted from a position beyond the front end of the ferrule; and
at least one polymeric material arranged within the at least one internal bore of the ferrule at least in front of the terminal end of the at least one optical fiber and extending to at least the front end of the ferrule.

2. The fiber optic connector of claim 1, wherein the terminal end of the at least one optical fiber is spaced from the front end of the ferrule by a distance in a range of from about 0.5 µm to about 50 µm.

3. The fiber optic connector of claim 1, wherein:
the at least one internal bore of the ferrule comprises a front end portion arranged proximate to the front end and a medial portion arranged proximate to the front end portion;
the medial portion comprises a first average diameter; and
the front end portion comprises a second average diameter that exceeds the first average diameter.

4. The fiber optic connector of claim 3, wherein the front end portion of the at least one internal bore comprises a conical or frustoconical shape having a maximum diameter at the front end of the ferrule.

5. The fiber optic connector of claim 1, wherein the at least one polymeric material protrudes outward from the front end of the ferrule.

6. The fiber optic connector of claim 1, wherein the at least one polymeric material comprises a plurality of protrusions that extend outward from the front end of the ferrule.

7. The fiber optic connector of claim 6, wherein the plurality of protrusions comprises a first protrusion of a first length and a second protrusion of a second length that differs from the first length.

8. The fiber optic connector of claim 1, further comprising an adhesive material positioned between the at least one polymeric material and at least one of (i) the ferrule or (ii) the at least one optical fiber.

9. The fiber optic connector of claim 1, wherein the terminal end of the at least one optical fiber is unpolished.

10. The fiber optic connector of claim 1, wherein the at least one polymeric material comprises an outer polymeric material layer and at least one inner polymeric material layer arranged between the outer polymeric material layer and the terminal end of the at least one optical fiber.

11. The fiber optic connector of claim 10, wherein the outer polymeric material layer or the at least one inner polymeric material layer comprises one or more of the following: a scratch resistance layer, an anti-static layer, an anti-reflectance layer, or a lens layer.

12. The fiber optic connector of claim 1, wherein the ferrule comprises a multi-fiber ferrule, the at least one internal bore comprises a plurality of internal bores, and the at least one optical fiber comprises a plurality of optical fibers, wherein each optical fiber of the plurality of optical fibers extends into a corresponding internal bore of the plurality of internal bores.

13. The fiber optic connector of claim 1, wherein the at least one optical fiber comprises a glass material, and wherein the at least one polymeric material comprises a modulus of elasticity that is no greater than about 80% of a modulus of elasticity of the glass material of the at least one optical fiber.

14. The fiber optic connector of claim 1, wherein the at least one polymeric material comprises an inorganic-organic hybrid polymer.

15. The fiber optic connector of claim 14, wherein the inorganic-organic hybrid polymer of the at least one polymeric material comprises at least one of the following properties: inorganic-organic hybrid polymer is UV-curable; the inorganic-organic hybrid polymer comprises polymerizable moieties, or the inorganic-organic hybrid polymer comprises a functional group enabling photo-induced curing.

16. The fiber optic connector of claim 1, wherein:
the at least one polymeric material comprises a waveguide material having a first refractive index and a surrounding material having a second refractive index that differs from the first refractive index; and
the waveguide material is shaped into at least one waveguide region that extends between the terminal end of the at least one optical fiber to an outer end face of the at least one polymeric material, and wherein the at least one waveguide region is laterally embedded in the surrounding material.

17. The fiber optic connector of claim 1, wherein:
the at least one optical fiber comprises a multi-core optical fiber; and
the at least one polymeric material protrudes outward from the front end of the ferrule to define a plurality of compression spots, wherein each compression spot of the plurality of compression spots is substantially registered with a different optical fiber core of the multi-core optical fiber.

18. The fiber optic connector of claim 1, wherein:
the at least one optical fiber comprises a multi-core optical fiber defining a plurality of optical fiber cores;
the at least one polymeric material comprises a waveguide material having a first refractive index and a surrounding material having a second refractive index that differs from the first refractive index; and
the waveguide material is shaped into a plurality of waveguide regions, wherein each waveguide region of the plurality of waveguide regions extends between a terminal end of a different optical fiber core of the plurality of optical fiber cores to an outer end face of the at least one polymeric material, and wherein each waveguide region is laterally embedded in the surrounding material.

19. A method for fabricating a fiber optic connector including a ferrule that has a front end for optical coupling with a mating component, a rear end, and at least one internal bore extending between the front end and the rear end, the method comprising:
inserting at least one optical fiber through the rear end of the ferrule into the at least one internal bore;
causing a leading end of the at least one optical fiber inserted into the at least one internal bore to extend beyond the front end of the ferrule;
positioning a terminal end of the at least one optical fiber between the front end and the rear end;

applying at least one polymeric material to a front end portion of the at least one internal bore to cause the at least one polymeric material to extend from a location in front of the terminal end of the at least one optical fiber to at least the front end of the ferrule; and curing the at least one polymeric material.

20. The method of claim 19, wherein said positioning includes securing the at least one optical fiber to the ferrule with an adhesive material arranged between the at least one optical fiber and the at least one internal bore, and the method further comprises:

applying the adhesive material to the at least one internal bore prior to said inserting of the at least one optical fiber; and processing the leading end of the at least one optical fiber to yield said terminal end of the at least one optical fiber;

wherein said positioning of the terminal end of the at least one optical fiber includes retracting the terminal end to a position within the ferrule between the front end and the rear end.

21. The method of claim 19, wherein said curing of the at least one polymeric material comprises impinging laser emissions on the at least one polymeric material.

22. The method of claim 19, wherein said curing of the at least one polymeric material comprises at least one of a photonic, thermal, or chemical interaction with the at least one polymeric material.

23. The method of claim 19, wherein the at least one polymeric material comprises an outer polymeric material layer and at least one inner polymeric material layer, and said applying of the at least one polymeric material to the front end portion of the at least one internal bore comprises applying the at least one inner polymeric material layer to the front end portion of the at least one internal bore with the at least one inner polymeric material layer in contact with the terminal end of the at least one optical fiber, followed by applying the outer polymeric material layer over the at least one inner polymeric material layer.

24. The method of claim 19, wherein:

the at least one polymeric material comprises a waveguide material having a first refractive index and a surrounding material having a second refractive index that differs from the first refractive index; and said applying of the at least one polymeric material and said curing of the at least one polymeric material include applying of at least a portion of the waveguide material and curing of the at least a portion of the waveguide material to form at least one waveguide region that extends between the terminal end of the at least one optical fiber to an outer end face of the at least one polymeric material, followed by applying of at least a portion of the surrounding material and curing of the at least a portion of the surrounding material to laterally embed the at least one waveguide region.

25. A method for fabricating a fiber optic connector including a ferrule that has a front end, a rear end, and at least one internal bore extending between the front end and the rear end, the method comprising:

inserting at least one optical fiber through the rear end of the ferrule into the at least one internal bore;

positioning a terminal end of the at least one optical fiber between the front end and the rear end;

inserting at least one prefabricated polymeric material in a front end portion of the at least one internal bore to cause the at least one prefabricated polymeric material to extend from a location in front of the terminal end of the at least one optical fiber to at least the front end of the ferrule;

applying at least one adhesive material to the at least one internal bore prior to said inserting of the at least one optical fiber;

causing a leading end of the at least one optical fiber inserted into the at least one internal bore to extend beyond the front end of the ferrule; and processing the leading end of the at least one optical fiber to yield said terminal end of the at least one optical fiber;

wherein said positioning includes securing the at least one optical fiber to the ferrule with the at least one adhesive material arranged between the at least one optical fiber and the at least one internal bore;

wherein said positioning of the terminal end of the at least one optical fiber includes retracting the terminal end to a position within the ferrule between the front end and the rear end.

26. The method of claim 25, further comprising applying the at least one adhesive material to one or more of the following areas: (a) a groove in a lateral surface of the at least one prefabricated polymeric material, (b) at least one cavity in an inner face of the at least one prefabricated polymeric material, or (c) between the at least one optical fiber and the at least one internal bore.

27. The method of claim 26, further comprising curing the at least one adhesive material.

28. The method of claim 25, wherein:

the at least one prefabricated polymeric material comprises a waveguide material having a first refractive index and a surrounding material having a second refractive index that differs from the first refractive index; and the at least one prefabricated polymeric material comprises at least one waveguide region that extends between the terminal end of the at least one optical fiber to an outer end face of the at least one prefabricated polymeric material.

\* \* \* \* \*

UNITED STATES PATENT AND TRADEMARK OFFICE
CERTIFICATE OF CORRECTION

| | |
|---|---|
| PATENT NO. | : 11,249,256 B2 |
| APPLICATION NO. | : 16/675948 |
| DATED | : February 15, 2022 |
| INVENTOR(S) | : Chenueh Abongwa Florian Lohse et al. |

It is certified that error appears in the above-identified patent and that said Letters Patent is hereby corrected as shown below:

On the Title Page

On the page 2, in Column 2, item (56), under "Other Publications", Line 2, delete "ny" and insert -- by --.

Signed and Sealed this
Tenth Day of May, 2022

Katherine Kelly Vidal
*Director of the United States Patent and Trademark Office*